US012141941B2

(12) United States Patent
Karras et al.

(10) Patent No.: US 12,141,941 B2
(45) Date of Patent: Nov. 12, 2024

(54) GENERATIVE NEURAL NETWORKS WITH REDUCED ALIASING

(71) Applicant: NVIDIA Corporation, Santa Clara, CA (US)

(72) Inventors: Tero Tapani Karras, Helsinki (FI); Miika Samuli Aittala, Helsinki (FI); Samuli Matias Laine, Vantaa (FI); Erik Andreas Härkönen, Uusimaa (FI); Janne Johannes Hellsten, Helsinki (FI); Jaakko T. Lehtinen, Helsinki (FI); Timo Oskari Aila, Tuusula (FI)

(73) Assignee: NVIDIA Corporation, Santa Clara, CA (US)

( * ) Notice: Subject to any disclaimer, the term of this patent is extended or adjusted under 35 U.S.C. 154(b) by 392 days.

(21) Appl. No.: 17/562,494

(22) Filed: Dec. 27, 2021

(65) Prior Publication Data

US 2022/0405880 A1 Dec. 22, 2022

Related U.S. Application Data

(60) Provisional application No. 63/244,125, filed on Sep. 14, 2021, provisional application No. 63/211,899, filed on Jun. 17, 2021.

(51) Int. Cl.
*G06T 3/20* (2006.01)
*G06T 3/4046* (2024.01)
(Continued)

(52) U.S. Cl.
CPC .............. *G06T 3/4046* (2013.01); *G06T 3/20* (2013.01); *G06T 3/4053* (2013.01); *G06T 3/60* (2013.01); *G06T 2200/12* (2013.01)

(58) Field of Classification Search
CPC .................................................... G06T 3/4046
See application file for complete search history.

(56) References Cited

U.S. PATENT DOCUMENTS

2017/0006299 A1 1/2017 Chiu et al.
2019/0385276 A1 12/2019 Kondo
(Continued)

OTHER PUBLICATIONS

U.S. Appl. No. 17/562,521, filed Dec. 27, 2021.
(Continued)

*Primary Examiner* — Oneal R Mistry
(74) *Attorney, Agent, or Firm* — Leydig, Voit & Mayer, Ltd.

(57) ABSTRACT

Systems and methods are disclosed that improve output quality of any neural network, particularly an image generative neural network. In the real world, details of different scale tend to transform hierarchically. For example, moving a person's head causes the nose to move, which in turn moves the skin pores on the nose. Conventional generative neural networks do not synthesize images in a natural hierarchical manner: the coarse features seem to mainly control the presence of finer features, but not the precise positions of the finer features. Instead, much of the fine detail appears to be fixed to pixel coordinates which is a manifestation of aliasing. Aliasing breaks the illusion of a solid and coherent object moving in space. A generative neural network with reduced aliasing provides an architecture that exhibits a more natural transformation hierarchy, where the exact sub-pixel position of each feature is inherited from underlying coarse features.

20 Claims, 16 Drawing Sheets

(51) Int. Cl.
G06T 3/4053 (2024.01)
G06T 3/60 (2006.01)

(56) References Cited

U.S. PATENT DOCUMENTS

| | | | |
|---|---|---|---|
| 2021/0166348 A1 | 6/2021 | Na et al. | |
| 2021/0321963 A1* | 10/2021 | Manor | G06T 11/00 |
| 2021/0342976 A1 | 11/2021 | Navarrete et al. | |
| 2022/0198607 A1 | 6/2022 | Chen et al. | |
| 2022/0327662 A1* | 10/2022 | Matsuura | G06T 3/4046 |
| 2022/0366538 A1* | 11/2022 | Kim | G06T 3/4053 |
| 2022/0399101 A1* | 12/2022 | Cai | G16H 50/20 |

OTHER PUBLICATIONS

Abadi, M., et al., "TensorFlow: A system for large-scale machine learning," In Proc. 12th USENIX Conference on Operating Systems Design Implementation, OSDI'16, pp. 265-283, 2016.
Abdal, R., et al., "StyleFlow: Attribute-conditioned exploration of StyleGAN-generated images using conditional continuous normalizing flows," ACM Trans. Graph, 40(3), 2021.
Alaluf, Y., et al., "Only a matter of style: Age transformation using a style-based regression model," CoRR, abs/2102.02754, 2021.
Anokhin, I., et al., "Image generators with conditionally-independent pixel synthesis," CoRR, abs/2011.13775, 2020.
Azulay, A., et al., "Why do deep convolutional networks generalize so poorly to small image transformations?" Journal of Machine Learning Research, 20(184):1-25, 2019.
Bau, D., et al., "Pain by word." CoRR, abs/2103.10951, 2021.
Bau, D., et al., "Rewriting a deep generative model," In Proc. ECCV, 2020.
Bau, D., et al., "GAN dissection: Visualizing and understanding generative adversarial networks," In Proc. ICLR, 2019.
Blahut., R.E., "Theory of remote image formation," Cambridge University Press, 2004.
Broad, T., et al., "Network bending: Expressive manipulation of deep generative models," In Proc. EvoMUSART, pp. 20-36, 2021.
Brock, A., et al., "Large scale GAN training for high fidelity natural image synthesis," In Proc. ICLR, 2019.
Chaman, A., et al., "Truly shift-invariant convolutional neural networks," CoRR, abs/2011.14214, 2020.
Chen, Y., et al., "Learning continuous image representation with local implicit image function," CoRR, abs/2012.09161, 2020.
Choi, Y., et al., "StarGAN v2: Diverse image synthesis for multiple domains," In Proc. CVPR, 2020.
Chu, M., et al., "Learning temporal coherence via self-supervision for GAN-based video generation," ACM Trans. Graph., 39(4), 2020.
Cohen, T.S., et al., "Group equivariant convolutional networks," In Proc. ICML, 2016.
Dey, N., et al., "Group equivariant generative adversarial networks," In Proc. ICLR, 2021.
Goodfellow, I., et al., "Generative adversarial nets," In Proc. NIPS, 2014.
Gu, J., et al., "Image processing using multi-code GAN prior," In Proc. CVPR, 2020.
Gwern, "Making anime faces with stylegan," https://www.gwern.net.Faces#stylegan2-ext-moficiations, Accessed Jun. 4, 2021.
Hao, Z., et al., "GANcraft: Unsupervised 3D neural rendering of minecraft worlds," CoRR, abs/2104.07659, 2021.
Harkonen, E., et al., "GANSpace: Discovering interpretable GAN controls," In Proc. NeurIPS, 2020.
Heusel, M., et al., "GANs trained by a two time-scale update rule coverage to a local Nash equilibrium," In Proc. NIPS, 2017.
Hill, K., et al., "Designed to deceive: Do these people look real to you?" The New York Times, 11, 2020.
Islam, M.A., et al., "How much position information do convolutional neural networks encode?" CoRR, abs/2001.08248, 2020.

Jahanian, A., et al., "On the 'steerability' of generative adversarial networks," In Proc. ICLR, 2020.
Kaiser, J.F., et al., "Nonrecursive digital filter design using the i_0-sinh window function," In Proc. 1974 IWWW International Symposium on Circuits & Systems, San Francisco DA, April pp. 20-23, 1974 (Abstract).
Karras, T., et al., "Progressive growing of GANs for improved quality, stability, and variation," In Proc. ICLR, 2018.
Karras, T., et al., "Training generative adversarial networks with limited data," In Proc. NeurIPS, 2020.
Karras, T., et al., "A style-based generator architecture for generative adversarial networks," In Proc. CVPR, 2018.
Karras, T., et al., "Analyzing and improving the image quality of StyleGAN," In Proc. CVPR, 2020.
Kayhan, O.S., et al., "On translation invariance in CNNs: Convolutional layers can exploit absolute spatial location," In Proc. CVPR, 2020.
Kingma, D.P., et al., "Adam: A method for stochastic optimization," In Proc. ICLR, 2015.
Liu, M., et al., "Unsupervised image-to-image translation networks," In Proc. NIPS, 2017.
Manfredi, M., et al., "Shift equivariance in object detection," In Proc. ECCV 2020 Workshops, 2020.
Menon, S., et al., "PULSE: Self-supervised photo unsampling via latent space exploration of generative models," In Proc. CVPR, 2020.
Mescheder, L., et al., "Which training methods for GANs do actually converge?" In Proc. ICML, 2018.
Park, T., et al., "Semantic image synthesis with spatially-adaptive normalization," In Proc. CVPR, 2019.
Park, T., et al., "Swapping autoencoder for deep image manipulation," In Proc. NeurIPS, 2020.
Parmar, G., et al., "On buggy resizing libraries and surprising subtleties in FID calculation," CoRR abs/2104.11222, 2021.
Paszke, A., et al., "PyTorch: An imperative style, high-performance deep learning library," In Proc. NeurIPS, 2019.
Patashnik, O., et al., "Styleclip: Text-driven manipulation of stylegan imagery," CoRR, abs/2103.17249, 2021.
Ramesh, A., et al., "Zero-shot text-to-image generation," CoRR, abs/2102.12092, 2021.
Richardson, E., et al., "Encoding in style: A StyleGAN encoder for image-to-image translation," CoRR, abs/2008.00951, 2020.
Seymour, M., "Canny Al: Imagine world leaders singing," fxguide, 4 2019.
Shannon, C.E., "Communication in the presence of noise," Proc. Institute of Radio Engineers, 37(1):10-21, 1949.
Shen, Y., et al., "Closed-form factorization of latent semantics in gans," In CVPR, 2021.
Sitzmann, V., et al., "Implicit neural representations with periodic activation functions," In Proc. NeurIPS, 2020.
Shorokhodov, I., et al., "Adversarial generation of continuous images," CoRR, abs/2011.12026, 2020.
Suzuki, R., et al., "Spatially controllable image synthesis with internal representation collaging," CoRR, abs/1811.10153, 2019.
Tancik, M., et al., "Fourier features let networks learn high frequency functions in low dimensional domains," In Proc. NeurIPS, 2020.
Tulyakov, S., et al., "MoCoGAN: Decomposing motion and content for video generation," In Proc. CVPR, 2018.
Turkowski, K., "Filters for Common Resampling Tasks," pp. 147-165, Academic Press Professional, Inc., USA, 1990.
Vasconcelos, C., et al., "An effective anti-aliasing approach for residual networks," CoRR, abs/2011.10675, 2020.
Wang, T., et al., "High-resolution image synthesis and semantic manipulation with conditional GANs," In Proc. CVPR, 2018.
Weiler, M., et al., "General E(2)-equivariant steerable CNNs," In Proc. NeurIPS, 2019.
Weiler, M., et al., "Learning steerable filters for rotation equivariant CNNs," In Proc. CVPR, 2018.
Worral, D., et al., "Deep scale-spaces: Equivariance over scale," In Proc. NeurIPS, 2019.
Worral, D. E., et al., "Harmonic networks: Deep translation and rotation equivariance," In Proc. CVPR, 2017.

(56) References Cited

OTHER PUBLICATIONS

Xu, R., et al., "Positional encoding as spatial inductive bias in GANs," CoRR, abs/2012.05217, 2020.

Yu, N. et al., "Artificial fingerprinting for generative models: Rooting deepfake attribution in training data," CoRR, abs/2007.08457, 2021.

Zhang, R., "Making convolutional networks shift-invariant again," In Proc. ICML, 2019.

Zhu, J.Y., et al., "Unpaired image-to-image translation using cycle-consistent adversarial networks," In Proc. ICCV, 2017.

Zou, X., et al., "Delving deeper into anti-aliasing in ConvNets," In Proc. BMVC, 2020.

* cited by examiner

Generated Image 105

Generated Image 110

Averaged Generated Images 115

Averaged Generated Images 120

Feature Map
251

Feature Map
252

Feature Map
261

Feature Map
262

Feature Map
271

Feature Map
272

GENERATIVE NEURAL NETWORKS WITH REDUCED ALIASING

CLAIM OF PRIORITY

This application claims the benefit of U.S. Provisional Application No. 63/211,899 titled "Alias-Free Generative Adversarial Networks," filed Jun. 17, 2021 and U.S. Provisional Application No. 63/244,125 titled "Alias-Free Generative Adversarial Neural Networks," filed Sep. 14, 2021, the entire contents of which are incorporated herein by reference.

BACKGROUND

Image synthesis neural networks, such as those that generate images of people's faces may be used to produce realistic images. However, as the overall image quality has improved, remaining visual artifacts have become more noticeable, particularly when motion is introduced. For example, as a person's head rotates relative to the camera, the ears and eyes also rotate, but finer details such as the person's teeth, wrinkles, freckles, whiskers, etc. usually do not rotate with the head or surface of the face as expected. Instead, the finer details or textures seem to "stick" to the image coordinates rather than moving with the physiological hierarchy. These sticking visual artifacts are a manifestation of aliasing within the intermediate feature maps of the neural network. There is a need for addressing these issues and/or other issues associated with the prior art.

SUMMARY

Embodiments of the present disclosure relate to generative neural networks with reduced aliasing. Systems and methods are disclosed that improve output quality and/or performance of any neural network, particularly an image generative neural network. In the real world, details of different scale tend to transform hierarchically. For example, moving a person's head causes the nose to move, which in turn moves the skin pores on it. The structure of a generative neural network is analogous: coarse, low-resolution features are hierarchically refined by upsampling, locally mixed by convolutions, and new detail is introduced through nonlinear operations. Despite the superficial similarity of a hierarchical structure, conventional generative neural network architectures do not synthesize images in a natural hierarchical manner: the coarse features seem to mainly control the presence of finer features, but not the precise positions of the finer features. Instead, much of the fine detail appears to be fixed to pixel coordinates as a result of aliasing, which leads to sticking visual artifacts. The disturbing "sticking" breaks the illusion of a solid and coherent object moving in space. A generative neural network with reduced aliasing provides an architecture that exhibits a more natural transformation hierarchy, where the sub-pixel position of each feature is inherited from underlying coarse features.

In contrast to conventional systems, such as those described above, the generative neural network with reduced aliasing attaches details in output data to features in the per-layer intermediate data instead of attaching the details to image coordinates (e.g., evenly spaced pixel positions). In an embodiment, the details are attached exclusively to the per-layer intermediate data. The aliasing reduction technique provides more natural movement for generated video. For example, as a person rotates their head, their teeth also translate with the movement instead of remaining still. Aliasing occurs during feature upsampling and nonlinear operations performed in the layers of the neural network. The upsampling, downsampling, and pointwise non-linear operations performed by conventional generative neural networks are modified for reduced aliasing performance.

A method, computer readable medium, and system are disclosed for generative neural networks with reduced aliasing. In an embodiment, the method includes a neural network model receiving low resolution input data that is processed by a sequence of stages (e.g., layers) to produce high resolution output data. The processing, for each operation performed in the sequence of stages that applies a pointwise nonlinearity to intermediate data at an original resolution, comprises: upsampling the intermediate data to produce increased resolution intermediate data; applying the pointwise nonlinearity to the increased resolution intermediate data to produce processed increased resolution intermediate data; and downsampling the processed increased resolution intermediate data to produce processed intermediate data. In an embodiment, the processed intermediate data is at the original resolution or a resolution that is higher compared with the original resolution.

BRIEF DESCRIPTION OF THE DRAWINGS

The present systems and methods for generative neural networks with reduced aliasing are described in detail below with reference to the attached drawing figures, wherein.

DETAILED DESCRIPTION

Systems and methods are disclosed related to generative neural networks with reduced aliasing. Image synthesis is used for a variety of applications, including image editing, domain translation, and video generation. Generative neural networks may also be used to synthesize three-dimensional (3D) volumes, audio signals, and the like. A generative neural network with reduced aliasing provides an architecture that exhibits a more natural transformation hierarchy. For example, in an embodiment, the exact sub-pixel position of each feature is exclusively inherited from underlying coarse features. The coarse features not only control the presence of finer features, but also control positions of the finer features on surfaces (e.g., face, head, etc.). Therefore, the generative neural network reduces aliasing, including, without limitation, the sticking visual artifacts.

Despite a hierarchical convolutional nature of generative neural networks, the synthesis process of conventional generative neural networks depends on absolute pixel co-ordinates in an unhealthy manner. The dependency manifests itself as, e.g., detail appearing to be glued to image coordinates instead of the surfaces of depicted objects. Conventional generative neural networks partially circumvent the ideal hierarchical construction by drawing on unintentional positional references available to the intermediate layers. In general, neural networks can be quite lazy and when possible, take shortcuts to bypass the strict hierarchical refinement. Sources of positional information include image borders and per-pixel noise inputs. The noise inputs may be removed and border handling may be modified to eliminate their contribution to this effect. Even when the borders are modified and per-pixel noise inputs are removed sticking artifacts remain. The remaining sticking visual artifacts are a manifestation of aliasing within the intermediate feature maps of the neural network.

Aliasing, despite being a subtle and critical issue, has received little attention in the neural network literature. Two sources of aliasing may be identified: first, faint after-images of the pixel grid resulting from non-ideal upsampling filters (e.g., nearest, bilinear, strided convolutions with learned kernel weights), and second, the pointwise application of nonlinearities such as a rectified linear activation function (ReLU). The conventional generative neural network has the means and motivation to amplify even the slightest amount of aliasing and, when combined over multiple scales, the conventional generative neural network may build a basis for texture motifs defining finer details that are fixed in screen coordinates. Aliasing is introduced by most filters commonly used in deep learning, and even high-quality filters used in image processing. Processing by a conventional generative neural network typically amplifies aliasing that is introduced.

Figure 1A:
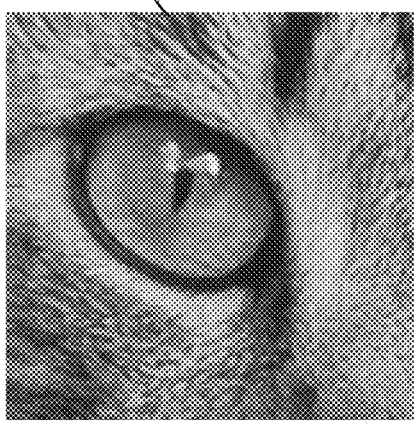
FIG. 1A illustrates images generated using a conventional generative neural network and images generated using the generative neural network with reduced aliasing, in accordance with an embodiment.
Figure 1A:
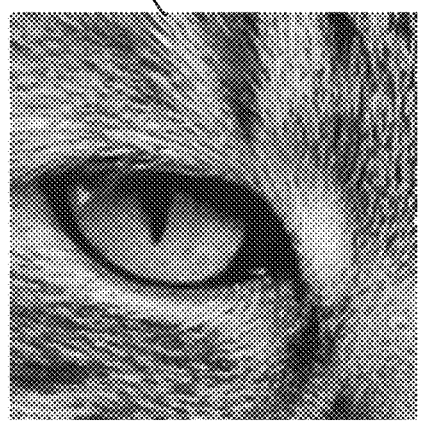
Figure 1A:
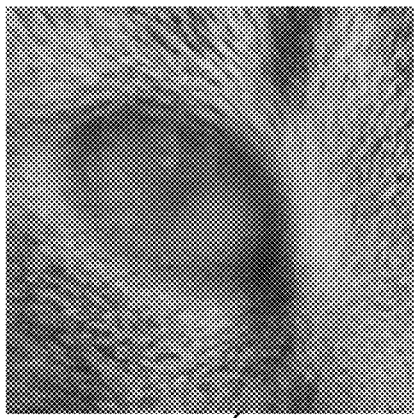
Figure 1A:
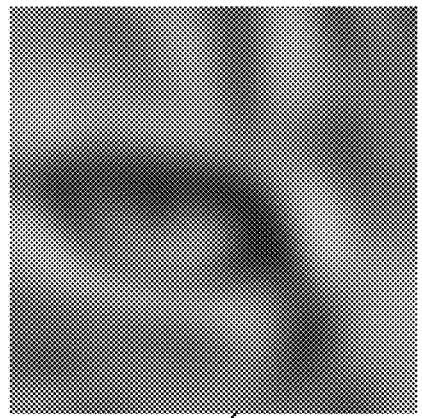

FIG. 1A illustrates images generated using a conventional generative neural network and images generated using the generative neural network with reduced aliasing, in accordance with an embodiment. A generated image 105 is synthesized from a latent code using a conventional generative neural network and a generated image 110 is synthesized from a latent code using a generative neural network with reduced aliasing. The generated images 105 and 110 both appear to be high quality and realistic. Aliasing or "texture sticking" is illustrated by averaging images for the same region that are generated in response to small changes (e.g., random perturbations) in the latent code. Without aliasing, the result should be uniformly blurry because the fine details should move with the surface rather than sticking to the pixel coordinates. However, as illustrated in averaged generated image 115 that represents the average of several images produced by the conventional generative neural network, some fine details, such as fur sticks to the same pixel coordinates and appears clear and sharp. In contrast, averaged generated image 120 that represents an average of several images produced by the generative neural network with reduced aliasing, the fine details appear uniformly blurry.

Figure 1B:
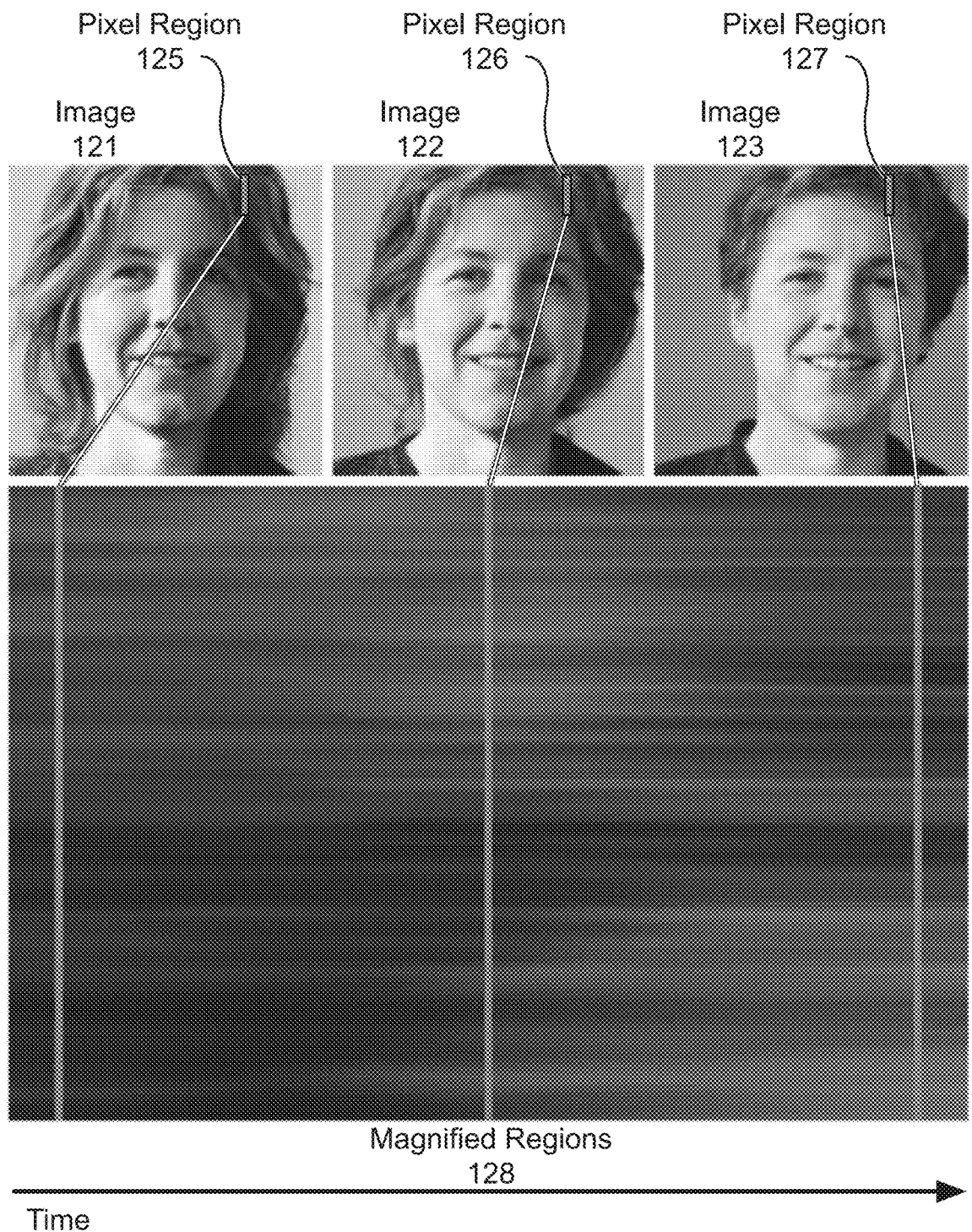
FIG. 1B illustrates fine details of images generated using a conventional generative neural network, in accordance with the prior art.

FIG. 1B illustrates fine details of images 121, 122, and 123 generated using a conventional generative neural network, in accordance with the prior art. The images 121, 122, and 123 (and additional images that are not shown) are synthesized in sequence over time via latent space interpolation to produce in-between images that smoothly transition over time, resulting in a morphing effect. A short vertical segment of pixels is extracted from the same position in each of the images 121, 122, and 123 to produce pixel regions 125, 126, and 127, respectively. The pixel regions 125, 126, and 127 are organized (stacked) horizontally, as shown in magnified regions 128. The desired result is hairs moving in animation, creating a time-varying field. The magnified regions 128 also includes additional pixel regions stacked horizontally, where the additional regions are extracted from the additional images synthesized between the images 121 and 122 and the images 122 and 123. The hairs appear mostly unchanged in position over time as illustrated by the horizontal streaks from pixel region 125, to pixel region 126, and extending to pixel region 127 in the magnified regions 128.

Figure 1C:
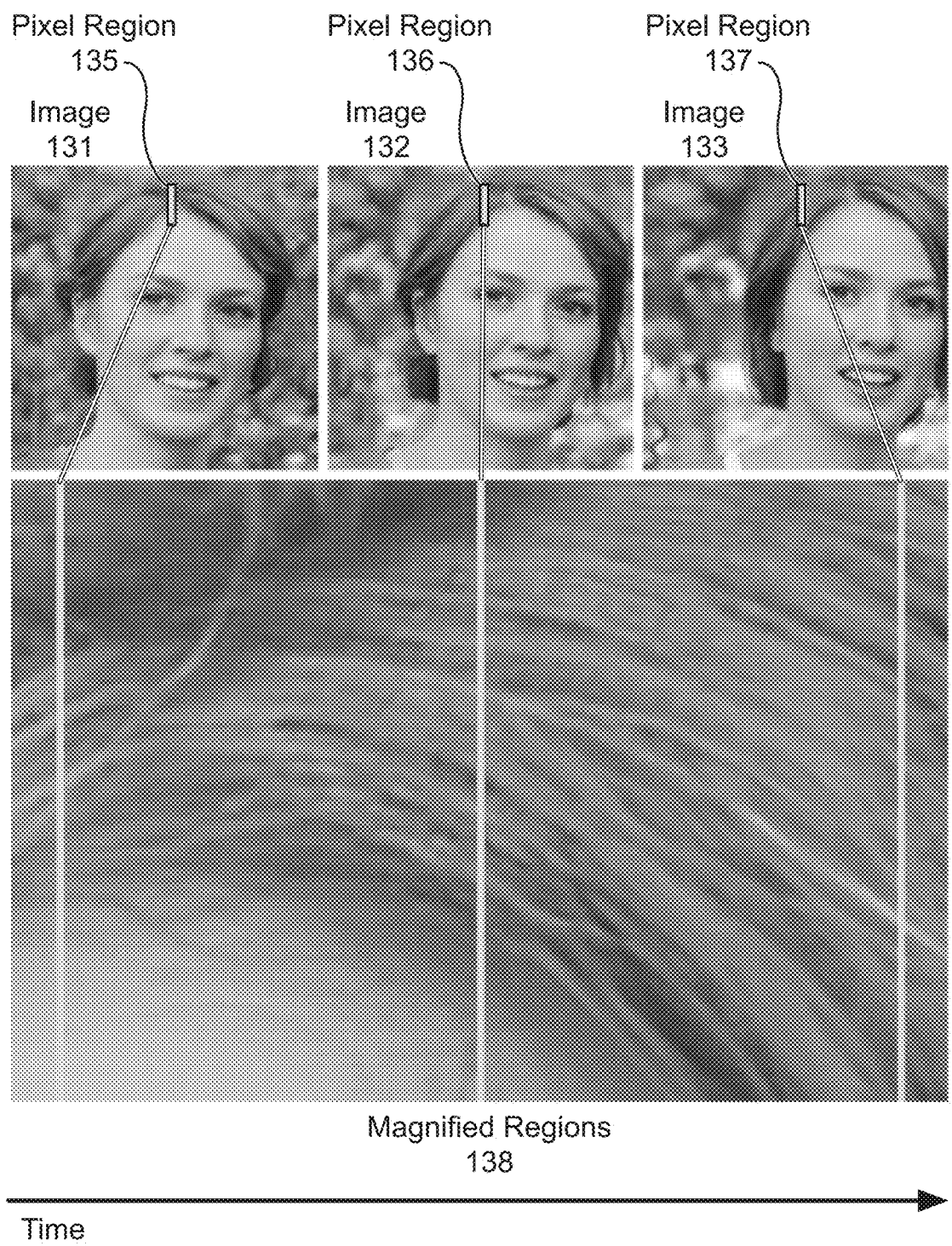
FIG. 1C illustrates fine details of images generated using the generative neural network with reduced aliasing, in accordance with an embodiment.

FIG. 1C illustrates fine details of images 131, 132, and 133 generated using the generative neural network with reduced aliasing, in accordance with an embodiment. The images 131, 132, and 133 (and additional images that are not shown) are synthesized in sequence over time via latent space interpolation to produce in-between images that smoothly transition over time, resulting in a morphing effect. A short vertical segment of pixels is extracted from the same position in each of the images 131, 132, and 133 to produce pixel regions 135, 136, and 137, respectively. The pixel regions 135, 136, and 137 are organized (stacked) horizontally, as shown in magnified regions 138. The magnified regions 138 also includes additional pixel regions stacked horizontally, where the additional regions are extracted from the additional images synthesized between the images 131 and 132 and the images 132 and 133. In contrast with the hairs that appear mostly unchanged in the magnified regions 128, the hairs in the magnified regions 138 move over time from pixel region 135, to pixel region 136, and extending to pixel region 137, creating a time-varying field.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1D:
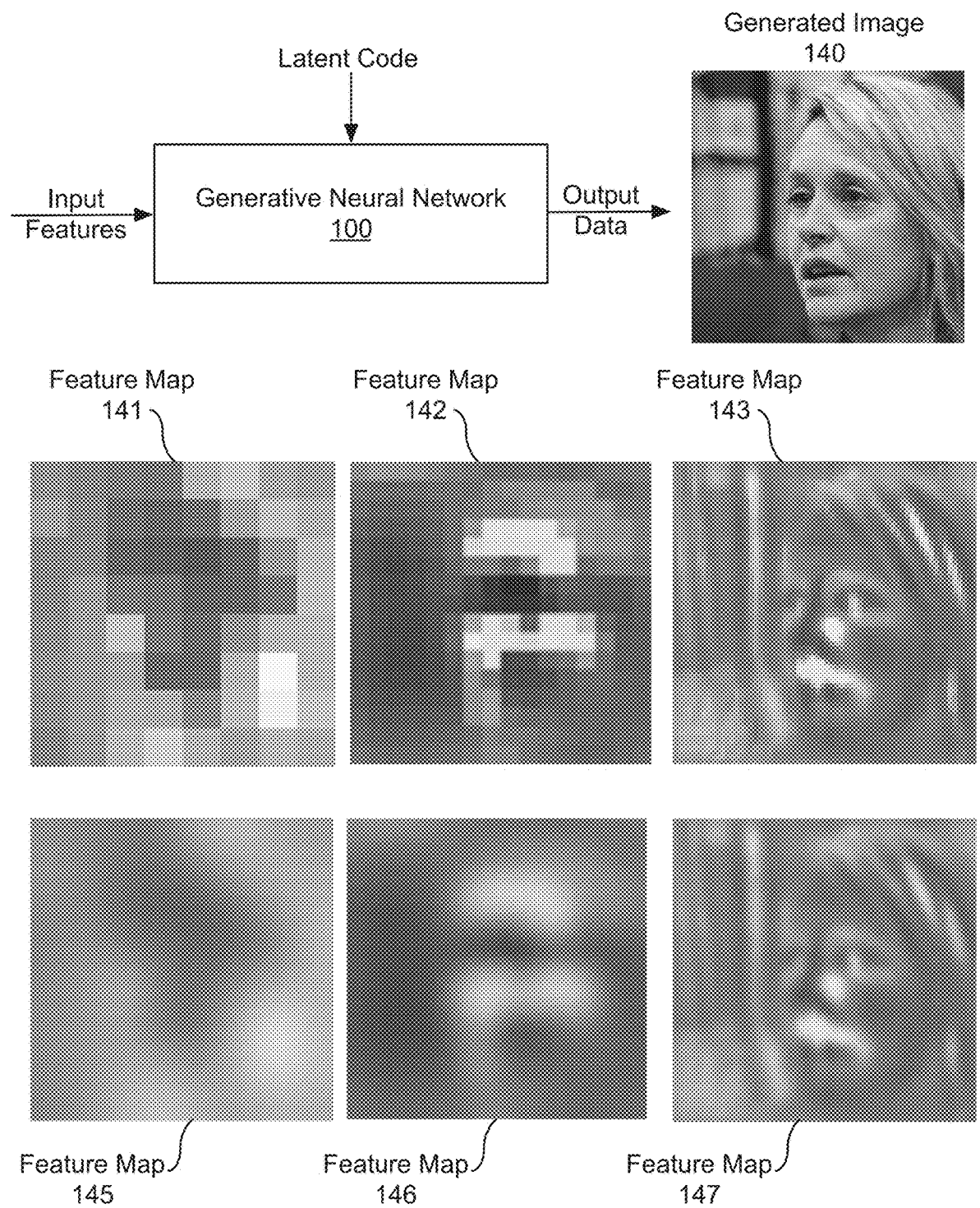
FIG. 1D illustrates a generative neural network with reduced aliasing and conceptual feature maps at different levels of the hierarchy suitable for use in implementing some embodiments of the present disclosure.

FIG. 1D illustrates a generative neural network 100 with reduced aliasing and conceptual feature maps 141, 142, and 143 at different levels of a processing hierarchy suitable for use in implementing some embodiments of the present disclosure. In an embodiment, the generative neural network 100 with reduced aliasing receives input features as inputs that are processed according to a latent code to synthesize output data. In an embodiment, the output data is a generated image 140. The output data may be a one-dimensional (1D) signal (e.g., audio data) or higher dimensional data (e.g., 3D scan), without limitation. In an embodiment, the latent code comprises 512 numbers. In an embodiment, the latent code is mapped to an intermediate latent space to produce one or more modulation signals that are provided to at least one layer of the generative neural network 100. In an embodiment, each of the one or more modulation signals is associated with a different hierarchical level of the generative neural network 100. In an embodiment, the input features are a learned constant. In an embodiment, the input features are Fourier features which naturally define a continuous feature map. The output data is synthesized based on the input features and the latent code.

The feature maps 141, 142, and 143 increase in resolution as the feature map generated by each layer is processed by a subsequent layer or stage in the generative neural network 100. At one or more of the layers, the feature maps are upsampled to increase the resolution. For example, a resolution of the feature map 143 is greater compared with the features maps 141 and 142. The resolution of the feature map 142 is greater compared with the feature map 141. When a simple filter, such as nearest neighbor, is used for upsampling, a grid pattern may be visible. Even when a more complex filter is used, the grid pattern may not be visible, but a conventional generative neural network may aggressively try to extract the grid pattern.

When the feature maps are represented in a continuous form instead of a discrete (e.g., pixelated) form, feature maps 145, 146, and 147 replace the feature maps 141, 142, and 143, respectively. Processing the feature maps 145, 146, and 147 would result in alias-free output data, but the processing requires much higher resolution, such that the bit width of each computation is unlimited which is impractical. However, as described further herein, it is possible to perform upsampling and other operations to better approximate the continuous feature maps 145, 146, and 147.

To reduce or eliminate aliasing, information that bypasses the hierarchical refinement should be eliminated so that the generative neural network 100 is prevented from using the information. While information introduced by image borders can be reduced by simply operating on slightly larger images, reducing or preventing aliasing is more difficult. Aliasing is most naturally treated in the classical Shannon-Nyquist signal processing framework, and a solution may be found by switching focus to bandlimited functions on a continuous domain that are merely represented by discrete sample grids. In a continuous domain, successful elimination of all sources of positional references means that details can be generated equally well regardless of pixel coordinates, which in turn is equivalent to enforcing continuous equivariance to sub-pixel translation (and optionally rotation) in all layers of the generative neural network 100.

Visually, equivariance to sub-pixel translation means that shifting a portion of the feature map 141 horizontally should cause a shift in a corresponding portion of each subsequent feature map 142 and 143 and the output data and have no other effect. Similarly, equivariance to rotation means that rotating a portion of the feature map 141 should rotate a corresponding portion of each subsequent feature map 142 and 143 and the output data and have no other effect. Fractional or sub-pixel translation and rotation is ill-defined in the discrete form of the feature maps 141, 142, and 143 but well-defined for the continuous form 145, 146, and 147.

Reconsidering the signal processing aspects of conventional generative neural networks, the conventional upsampling filters are simply not aggressive enough in suppressing aliasing, and extremely high-quality filters with over 100 dB stop-band attenuation may be required. A principled solution to aliasing caused by pointwise nonlinearities may be found by considering effects of the pointwise nonlinearities in the continuous domain and appropriately low-pass filtering the results. Furthermore, constraining convolution operations to 1×1 kernels may yield a strong, rotation equivariant generative neural network 100. Once aliasing is adequately suppressed to force the generative neural network 100 to implement more natural hierarchical refinement, the generative neural network 100 operation changes drastically: details are correctly attached to underlying surfaces, as shown in FIG. 1C.

Even though data may be stored as values in a pixel grid, such as the discrete feature maps 141, 142, and 143, the values should not be assumed to directly represent a signal that is processed by the layers of the generative neural network 100. According to the Nyquist-Shannon sampling theorem, a regularly sampled signal can represent any continuous signal containing frequencies between zero and half of the sampling rate. Consider a two-dimensional, discretely sampled feature map $Z[x]$ that consists of a regular grid of Dirac impulses of varying magnitudes, spaced $1/s$ units apart, where $s$ is the sampling rate. This is analogous to an infinite two-dimensional grid of values.

Given $Z[x]$ and $s$, the Whittaker-Shannon interpolation formula states that the corresponding continuous representation $z(x)$ is obtained by convolving the discretely sampled Dirac grid $Z[x]$ with an ideal interpolation filter $\phi_s$, i.e., $z(x)=(\phi_s*Z)(x)$, where * denotes continuous convolution and $\phi_s(x)=\text{sinc}(sx_0)\cdot\text{sinc}(sx_1)$ using the signal processing convention of defining sinc $(x)=\sin(\pi x)/(\pi x)$. $\phi_s$ has a bandlimit of $s/2$ along the horizontal and vertical dimensions, ensuring that the resulting continuous signal captures all frequencies that can be represented with sampling rate $s$.

Figure 1E:
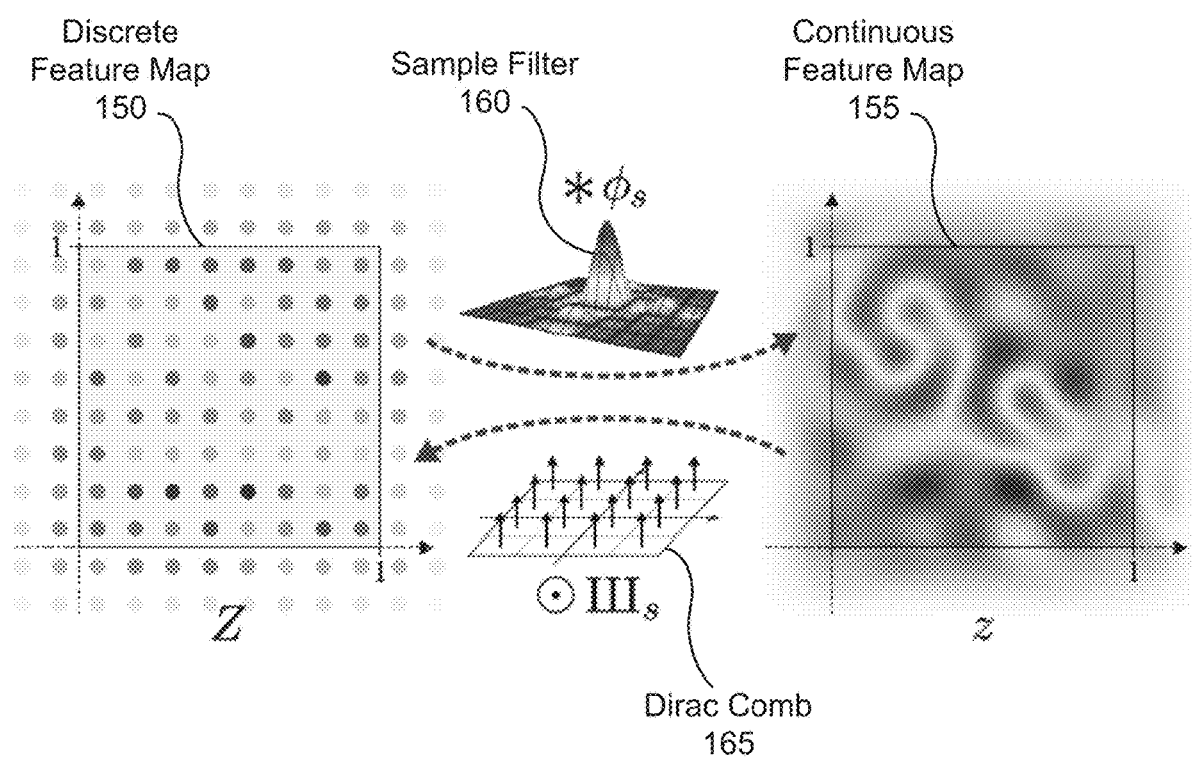
FIG. 1E is a conceptual diagram illustrating discrete and continuous representations of feature maps for use in implementing some embodiments of the present disclosure.

FIG. 1E is a conceptual diagram illustrating discrete and continuous representations of feature maps for use in implementing some embodiments of the present disclosure. A discrete representation Z of a discrete feature map 150 and a continuous representation z of a continuous feature map 155 are related to each other via convolution with ideal interpolation filter $\phi_s$ (sample filter 160) and pointwise multiplication with Dirac comb $III_S$ (Dirac comb 165).

Conversion from the continuous feature map 155 to the discrete feature map 150 domain corresponds to sampling the continuous signal $z(x)$ at the sampling points of $Z[x]$ that may be defined to be offset by half the sample spacing to lie at the "pixel centers" shown as circles. The sampling of the continuous feature map can be expressed as a pointwise multiplication with a two-dimensional $$\text{Dirac comb } III_S(x) = \sum_{X \in Z^2} \delta\left(x - \frac{X + \frac{1}{2}}{s}\right).$$

The unit square $x \in [0, 1]^2$ in z(x) (continuous feature map 155) may be earmarked as a canvas for the signal of interest. In the discrete feature map 150 Z[x] there are $s^2$ discrete samples in the unit square, but the convolution with the sample filter 160 $\phi_s$ means that values of Z[x] outside the unit square also influence z(x) inside it. Thus, storing an s×s-pixel feature map is not sufficient; in theory, the entire infinite Z[x] would need to be stored. As a practical solution, Z[x] may be stored as a two-dimensional array that covers a region slightly larger than the unit square. For example, each feature map 141, 142, and 143 is extended to include at least one additional feature value in each dimension. Extending the feature maps eliminates sticking artifacts caused by the borders. However, aliasing resulting from the discrete processing operations remains and may be reduced or eliminated as described further herein.

Having established correspondence between bandlimited, continuous feature map 155 z(x) and discretely sampled feature map 150 Z[x], the usual pixel-centric view of the signal can be ignored in favor of a continuous signal. In the context of the following description, z(x) is interpreted as being the actual signal being operated on, and the discretely sampled feature map 150 Z[x] is merely a convenient encoding for the continuous feature map 155 z(x).

Practical neural networks operate on the discretely sampled feature maps, such as the discrete feature map 150. Consider operation F (convolution, nonlinearity, etc.) operating on a discrete feature map: Z'=F(Z). The discrete feature map (e.g., discrete feature map 150) has a corresponding continuous counterpart (e.g., continuous feature map 155), so there is a corresponding mapping in the continuous domain: z'=f(z). Now, an operation specified in one domain can be seen to perform a corresponding operation in the other domain:

$$f(z) = \phi_{s'} * F(III_s \odot z), F(Z) = III_{s'} \lfloor f(\phi_s * Z), \quad \text{Eq. (1)}$$

where $\odot$ denotes pointwise multiplication and s and s' are the input and output sampling rates.

Operation f is equivariant with respect to a spatial transformation t of the 2D plane if operation f commutes with spatial transformation t in the continuous domain: t∘f=f∘t. Note that when inputs are bandlimited to s/2, an equivariant operation must not generate frequency content above the output bandlimit of s'/2, as otherwise no faithful discrete output representation exists. For example, when the frequency content of the continuous feature map 155 increases, the sampling rate s may also need to increase to ensure that detail in the continuous domain can be represented in the discrete domain. Failure to use a sufficient sampling rate results in aliasing that appears as sticking artifacts in each level of the discrete feature maps and the output. The sticking artifacts do not translate equivariantly with respect to the input. According to the Nyquist-Shannon sampling theorem, regularly sampled discrete feature maps can represent continuous feature maps containing frequencies between zero and half of the sampling rate.

In the case of rotation equivariance, the spectral constraint is somewhat stricter—rotating an image corresponds to rotating the spectrum, and in order to guarantee the bandlimit in both horizontal and vertical direction, the spectrum must be limited to a disc with radius s'/2. This applies to both the initial network input as well as the bandlimiting filters used for downsampling, as described further herein.

The primitive operations in a typical generative neural network include convolution, upsampling, downsampling, and nonlinearity. Without loss of generality, the operations are described as acting on a single feature map: pointwise linear combination of features has no effect on the analysis. Consider a standard convolution with a discrete kernel K. K may be interpreted as occupying the same grid as the input feature map, with sampling rate s. The discrete-domain operation is simply $F_{conv}(Z) = K*Z$, and the corresponding continuous operation is obtained from Eq. (1):

$$f_{conv}(z) = \phi_s * (K*(III_s \odot z)) = K*(\phi_s * (III_s \odot z)) = K*z \quad \text{Eq. (2)}$$

due to commutativity of convolution and the fact that discretization followed by convolution with ideal low-pass filter, both with same sampling rate s, is an identity operation, i.e., $\phi_s * (III_s \odot z) = z$. In other words, the convolution operates by continuously sliding the discretized kernel over the continuous representation of the feature map. The convolution introduces no new frequencies, so the bandlimit requirements for both translation and rotation equivariance are fulfilled.

Convolution also commutes with translation in the continuous domain, and thus the convolution operation is equivariant to translation. For rotation equivariance, the discrete kernel K needs to be radially symmetric. In an embodiment, symmetric 1×1 convolution kernels are, despite their simplicity, a viable choice for rotation equivariant generative neural networks.

An ideal upsampling operation does not modify the continuous representation as the purpose of upsampling is to increase the output sampling rate (s'>s) to add headroom in the spectrum where subsequent layers of the generative neural network 100 may introduce additional content. Translation and rotation equivariance follow directly from upsampling being an identity operation in the continuous domain. With $f_{up}(z) = z$, the discrete operation according to Eq. (1) is $F_{up}(Z) = III_{s'} \odot (\phi_s * Z))$. Choosing s'=ns with integer n, the discrete operation can be implemented by first interleaving Z with zeros to increase its sampling rate and then convolving the interleaved Z with a discretized downsampling filter $III_{s'} \odot \phi_s$.

In downsampling, z is low-pass filtered to remove frequencies above the output bandlimit, so that the signal can be represented faithfully in the coarser discretization. The operation in the continuous domain is $f_{down}(z) = \psi_{s'} * z$, where an ideal low-pass filter $\psi_{s'} := s'^2 \cdot \phi_{s'}$ is simply the corresponding interpolation filter normalized to unit mass. The discrete counterpart is $F_{down}(Z) = III_{s'} \odot (\psi_{s'} * (\phi_s * Z)) = 1/s^2 \cdot III_{s'} \odot (\psi_{s'} * \psi_s * Z) = (s'/s)^2 \cdot III_{s'} \odot (\phi_s * Z)$. The latter equality follows from $\psi_{s'} * \psi_s = \psi_{min(s,s')}$. Similar to upsampling, downsampling by an integer fraction can be implemented with a discrete convolution followed by dropping sample points. Translation equivariance follows automatically from the commutativity of $f_{down}(z)$ with translation, but for rotation equivariance $\phi_{s'}$ must be replaced with a radially symmetric filter having a disc-shaped frequency response. The ideal such filter is given by $\phi_s^\circ(x) = \text{jinc}(s\|x\|) = 2J_1(\pi s\|x\|)/(\pi s\|x\|)$, where $J_1$ is the Bessel function of the first kind.

Applying a pointwise nonlinearity σ in the discrete domain does not commute with fractional translation or rotation. However, in the continuous domain, any pointwise function commutes trivially with geometric transformations and is thus equivariant to translation and rotation. Fulfilling the bandlimit constraint is another challenge—applying, e.g., ReLU in the continuous domain may introduce arbitrarily high frequencies that cannot be represented in the discretized output.

A natural solution for pointwise nonlinearities is to eliminate the offending high-frequency content by convolving the continuous result with the ideal low-pass filter $\psi_s$. Then, the continuous representation of the nonlinearity becomes $f_\sigma(z) = \psi_s * \sigma(z) = s^2 \cdot \phi_s * \sigma(z)$ and the discrete counterpart is $F_\sigma(Z) = s^2 \cdot III_s \odot (\phi_s * \sigma(\phi_s * Z))$. The discrete operation cannot be realized without temporarily entering the continuous representation. The continuous representation may be approximated by upsampling the signal, applying the nonlinearity in the higher resolution, and downsampling the result afterwards. Even though the nonlinearity is still performed in the discrete domain, in an embodiment, only a 2× temporary resolution increase is sufficient for high-quality equivariance. For rotation equivariance, the radially symmetric low-pass filter $\phi_s^\circ$ should be used in the downsampling step, as discussed above.

Note that nonlinearity is the only operation capable of generating novel frequencies in generative neural network 100, and that the range of the novel frequencies can be limited by applying a reconstruction filter with a lower cutoff than s/2 before the final discretization operation. The reconstruction filter provides precise control over how much new information is introduced by each layer of the generative neural network 100. In sum, a pointwise nonlinear operation may produce arbitrarily high frequencies in the continuous domain $\sigma(z)$. Low-pass filtering with $\phi_s$ is necessary to ensure that Z' captures a result of the pointwise nonlinear operation in the discrete domain. A generative neural network may be converted to be fully equivariant, up to a desired level of accuracy, to translation and rotation by applying the theoretical ideas for performing convolution, upsampling, downsampling, and pointwise nonlinear operations in practice, resulting in a generative neural network with reduced aliasing, such as the generative neural network 100.

In an embodiment, the generative neural network 100 includes a mapping network and a synthesis network G. The mapping network transforms an initial, normally distributed latent value into an intermediate latent code w~$w$. The synthesis network receives a learned 4×4×512 constant $Z_0$ (i.e., input features) or Fourier features and applies a sequence of N layers—comprising convolutions, nonlinearities, upsampling, and (optionally) per-pixel noise—to produce an output image $Z_N = G(Z_0; w)$. In an embodiment, the intermediate latent code w controls the modulation of the convolution kernels in G. In an embodiment, the layers follow a rigid 2× upsampling schedule, where two layers are executed at each resolution and the number of feature maps is halved after each upsampling. In an embodiment, upsampling discrete data by 2× approximates continuous data and is sufficient to significantly reduce or prevent the introduction of aliasing during the subsequent pointwise nonlinear operation. In an embodiment, the upsampling is greater than 2× to better approximate continuous data.

Reducing or eliminating aliasing makes every layer of G equivariant w.r.t. the continuous signal, so that all finer details transform together with the coarser features of a local neighborhood. If successful, the entire generative neural network 100 becomes similarly equivariant. In other words, the continuous operation g of the synthesis network is made equivariant w.r.t. transformations t (translations and rotations) applied on the continuous input $z_0$: $g(t[z_0]; w) = t[g(z_0; w)]$.

Figure 2A:
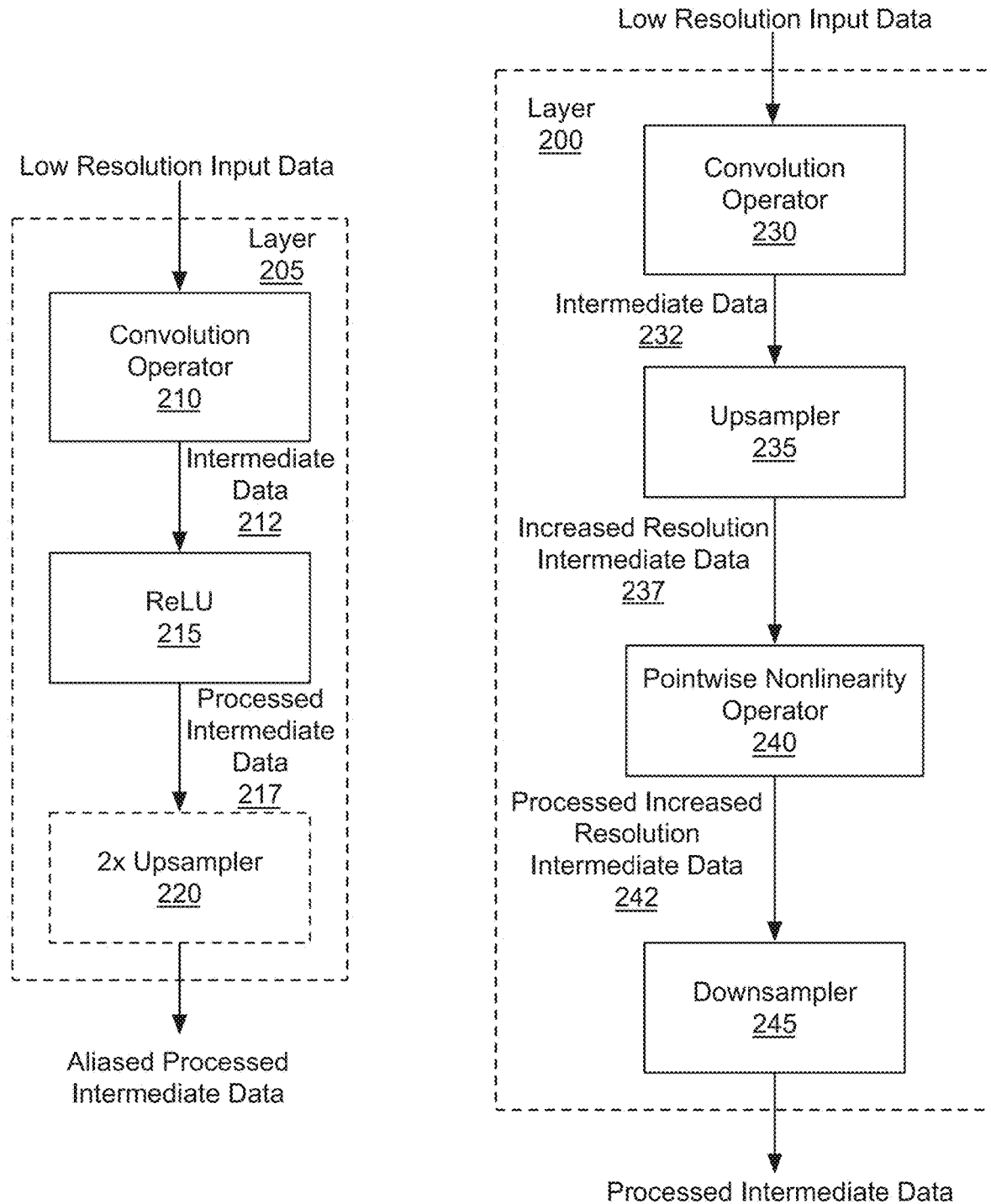
FIG. 2A illustrates block diagrams of an example processing layer for a conventional generative neural network and an example processing layer for a generative neural network with reduced aliasing, suitable for use in implementing some embodiments of the present disclosure.

FIG. 2A illustrates block diagrams of an example processing layer 205 for a conventional generative neural network and an example processing layer 200 for a generative neural network with reduced aliasing, suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the generative neural network 100 is within the scope and spirit of embodiments of the present disclosure.

Both the conventional generative neural network and the generative neural network 100 include a mapping network and a synthesis network G. As previously described, the mapping network transforms the latent code into an intermediate latent code w~$w$. The synthesis network receives input features $Z_0$ and applies a sequence of N layers—comprising convolutions, nonlinearities, and upsampling—to produce an output image $Z_N = G(Z_0; w)$. The intermediate latent code w controls the modulation of the convolution kernels in G.

The layer 205 is included in a conventional synthesis network and receives low resolution input data, such as a feature map, and produces aliased processed intermediate data. The layer 205 includes a convolution operator 210 that also receives modulation controls (not shown) from the mapping network and produces intermediate data 212. A ReLU 215 processes the intermediate data 212 to produce processed intermediate data 217. The processed intermediate data 217 is optionally processed by a 2× upsampler 220 to produce aliased processed intermediate data (e.g., feature map). Aliasing may be introduced by the ReLU 215, and the 2× upsampler 220. Techniques based on the continuous analysis may be used to reduce or remove the aliasing from each of the operations in the generative neural network 100 with reduced aliasing.

The layer 200 is modified compared with the layer 205 and may be included as one or more stages in a synthesis network portion of the generative neural network 100 with reduced aliasing. The layer 200 receives low resolution input data, such as a feature map, and produces processed intermediate data having reduced aliasing compared with the aliased processed intermediate data produced by the layer 205. The layer 200 includes a convolution operator 230 that also receives modulation controls (not shown) from the mapping network and produces intermediate data 232. In an embodiment, the convolution operator 230 may be configured to use an N×N convolution kernel, where N=1 for rotation equivariance.

An upsampler 235 processes the intermediate data 232 to produce increased resolution intermediate data 237 (e.g., feature map). In an embodiment, the upsampler 235 may be configured to perform 2× or 4× upsampling. The increased resolution intermediate data 237 is processed by a pointwise nonlinearity operation 240 to produce processed increased resolution intermediate data 242. In an embodiment, the pointwise nonlinearity operator 240 performs a ReLU operation. In an embodiment, upsampling the intermediate data 232 reduces aliasing during application of the pointwise nonlinearity.

The processed increased resolution intermediate data 242 is then downsampled by a downsampler 245 to produce the processed intermediate data. In an embodiment, the downsampler 245 downsamples the processed increased resolution intermediate data 242 by 2× to produce the processed intermediate data at an original resolution of the intermediate data 232. In an embodiment, the intermediate data 232 contains only spatial frequencies at or below half a sampling rate of an original resolution of the intermediate data 232. In an embodiment, a rate of the upsampling equals a rate of the downsampling. In an embodiment, a rate of the upsampling is twice a rate of the downsampling. In an embodiment, a rate of the downsampling is twice a rate of the upsampling. In an embodiment, the convolution operator 230, the upsampler 235, the pointwise nonlinearity operator 240, and the downsampler 245 perform operations that are equivariant to translation and/or rotation.

In an embodiment, at least one of the convolution operator 230, the upsampler 235, the pointwise nonlinearity operator 240, and the downsampler 245 is implemented on a server or in a data center and the high resolution output data is streamed to a user device. In an embodiment, at least one of the convolution operator 230, the upsampler 235, the pointwise nonlinearity operator 240, and the downsampler 245 is implemented within a cloud computing environment. In an embodiment, at least one of the convolution operator 230, the upsampler 235, the pointwise nonlinearity operator 240, and the downsampler 245 is implemented for training, testing, or certifying a neural network employed in a machine, robot, or autonomous vehicle. In an embodiment, at least one of the convolution operator 230, the upsampler 235, the pointwise nonlinearity operator 240, and the downsampler 245 is implemented on a virtual machine comprising a portion of a graphics processing unit.

Figure 2B:
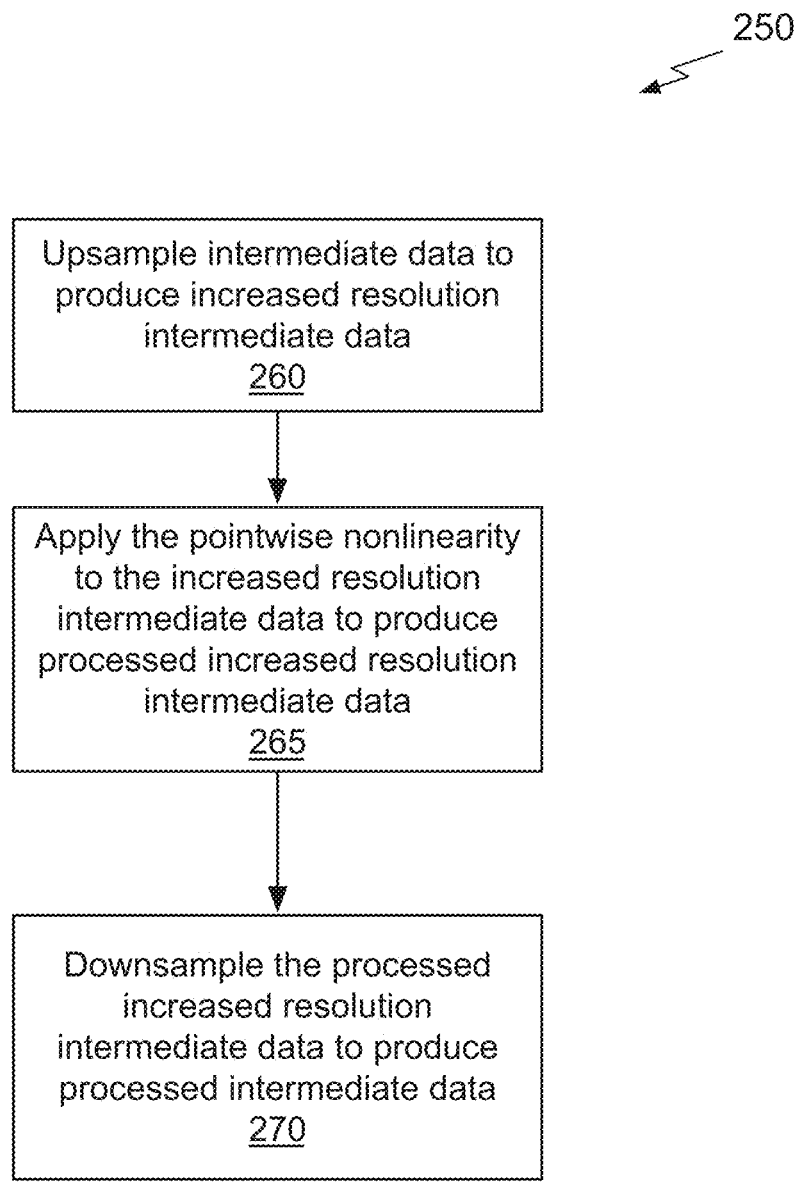
FIG. 2B illustrates a flowchart of a method for approximating alias-free operations, in accordance with an embodiment.

FIG. 2B illustrates a flowchart of a method 250 for approximating alias-free operations, in accordance with an embodiment. Each block of method 250, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 250 is described, by way of example, with respect to the system of FIG. 2A. However, this method may additionally or alternatively be executed by any one system, or any combination of systems, including, but not limited to, those described herein. Furthermore, persons of ordinary skill in the art will understand that any system that performs method 250 is within the scope and spirit of embodiments of the present disclosure.

A neural network model receives low resolution input data that is processed by a sequence of stages to produce high resolution output data. In an embodiment, the neural network model is the generative neural network 100 with reduced aliasing. In an embodiment, the processing, for each operation performed in the sequence of stages that applies a pointwise nonlinearity to intermediate data at an original resolution, comprises upsampling and downsampling. In an embodiment, one or more layers of the neural network model perform the method 250. In an embodiment, the one or more layers are the layer 200. In an embodiment, the low resolution input data is processed by a convolution operator to produce the intermediate data.

At step 260, the intermediate data is upsampled to produce increased resolution intermediate data. At step 265, the pointwise nonlinearity is applied to the increased resolution intermediate data to produce processed increased resolution intermediate data. At step 270, the processed increased resolution intermediate data is downsampled to produce processed intermediate data. In an embodiment, the processed intermediate data corresponds to the output data of the generative neural network 100 with reduced aliasing. In an embodiment, a linear transformation is performed on the processed intermediate data to produce the output data.

In an embodiment, the intermediate data contains no spatial frequencies above half a sampling rate of the original resolution. In an embodiment, a rate of the upsampling equals a rate of the downsampling and the processed intermediate data is at the original resolution. In an embodiment, a rate of the upsampling is twice a rate of the downsampling and the processed intermediate data is at twice the original resolution. In an embodiment, a rate of the downsampling is twice a rate of the upsampling. In an embodiment, the upsampling approximates continuous data and reduces aliasing during application of the pointwise nonlinearity. In an embodiment, the neural network model is a generator and the high resolution output data is an image.

Figure 2C:
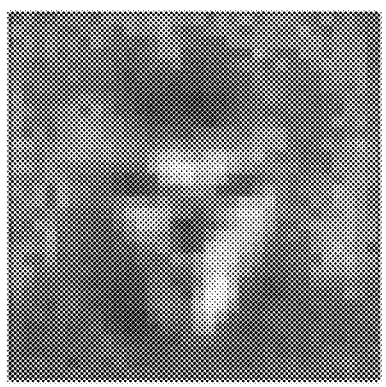
FIG. 2C illustrates feature maps produced by a conventional generative neural network and feature maps produced by the generative neural network with reduced aliasing, in accordance with an embodiment.
Figure 2C:
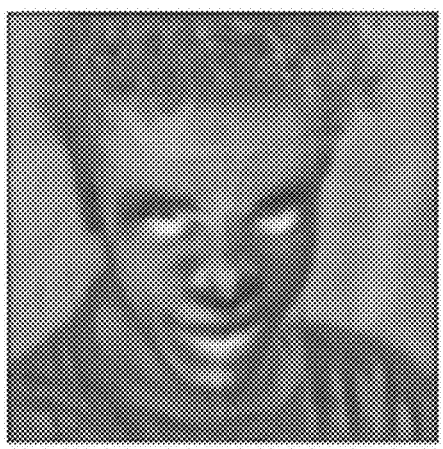
Figure 2C:
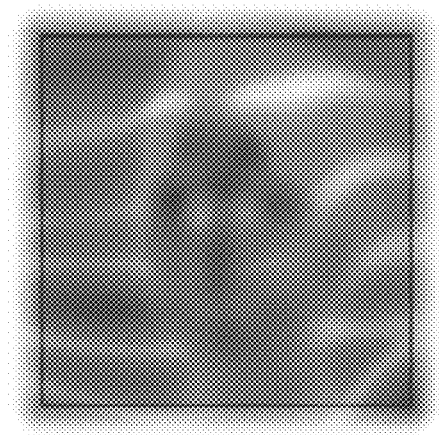
Figure 2C:
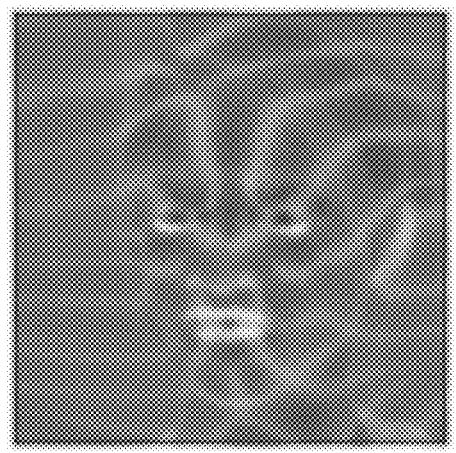
Figure 2C:
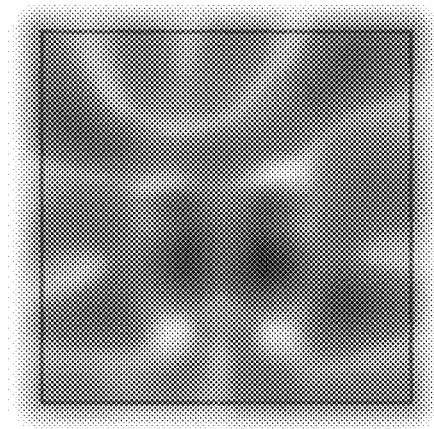
Figure 2C:
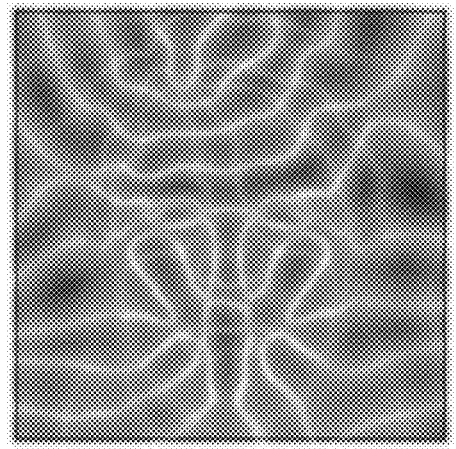
Figure 3:
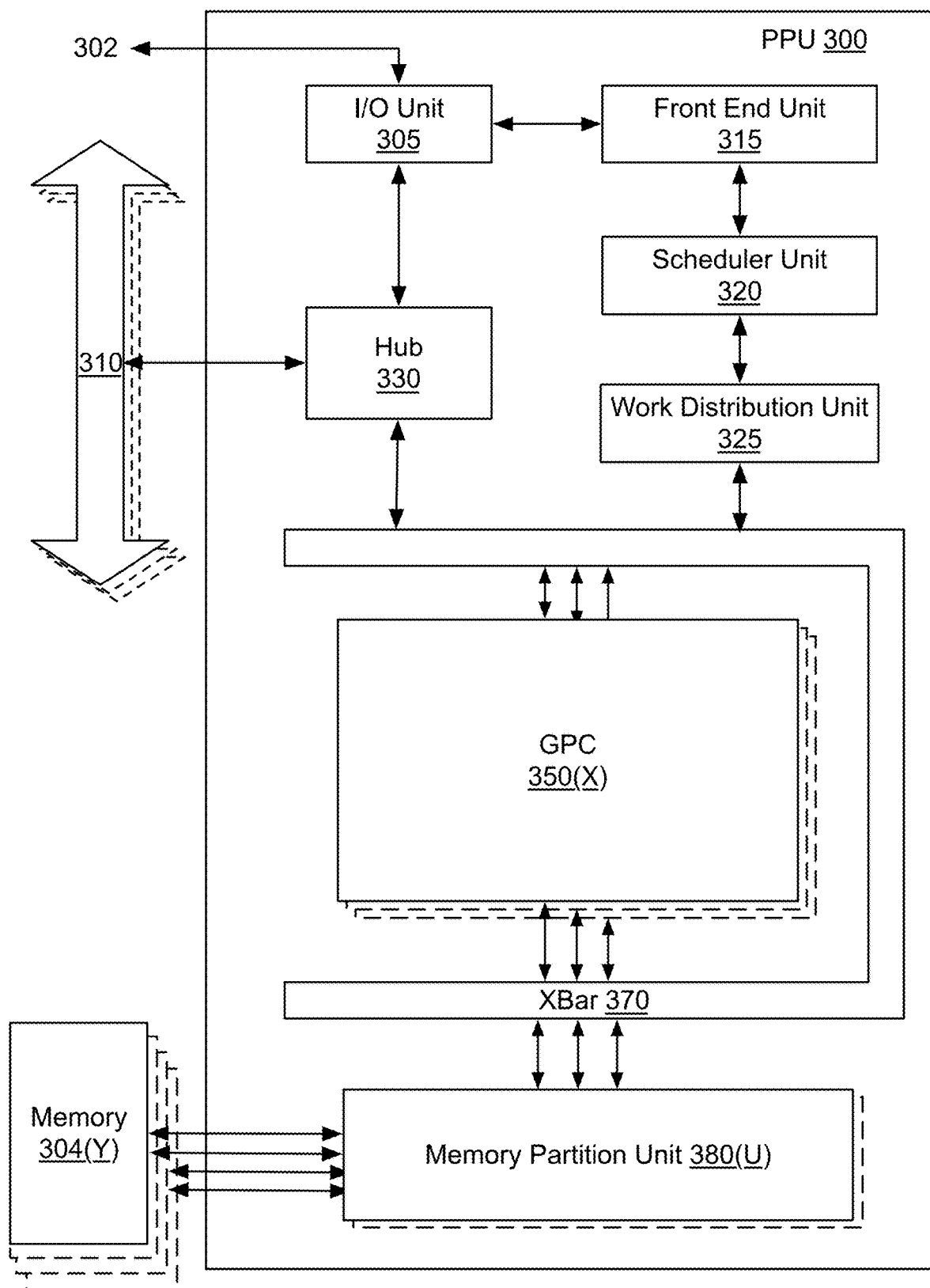
FIG. 3 illustrates an example parallel processing unit suitable for use in implementing some embodiments of the present disclosure.

FIG. 2C illustrates feature maps 251 and 252 produced by a conventional generative neural network and feature maps 261, 262, 271, and 272 produced by the generative neural network with reduced aliasing, in accordance with an embodiment. The feature maps are internal representations of the processed intermediate data produced by a layer of the neural network. The feature maps 251 and 252 are produced by layers of a conventional generative neural network, where the feature map 251 is coarser compared with the feature map 252. Note each pair of feature maps (e.g., 251 and 252) is processed to generate an image of a different person. Even though the resulting images are different, characteristics of the feature maps 251 and 252 are quite different compared with the feature maps 261, 262, 271, and 272. The feature maps 251 and 252 seem to encode signal magnitudes.

The feature maps 261, 262, 271, and 272 are produced by layers of a generative neural network with reduced aliasing, where the feature maps 261 and 271 are coarser compared with the feature maps 262 and 272. In contrast with the feature maps 251 and 252, the feature maps 261, 262, 271, and 272 seem to encode phase information. The phase information is needed for the generative neural network to synthesize detail on surfaces because the generative neural network cannot rely on the pixel coordinate system and instead needs to learn a coordinate system. Existence of a coordinate system that allows precise localization on the surfaces of objects should prove useful in various applications, including advanced image and video editing.

The feature maps 261 and 262 are translation equivariant compared with the feature maps 251 and 252. The feature maps 271 and 272 are both translation and rotation equivariant. More specifically, the convolution operations used to produce the feature maps 271 and 272 are limited to N=1 and a radially symmetric downsampling filter is used for improved rotation equivariance. In contrast, the convolution operations used to produce the feature maps 261 and 262 use N=3. Emergent positional encoding patterns appear to be somewhat more well-defined in the feature maps 271 and 272 compared with the feature maps 261 and 262.

In contrast to conventional systems, the generative neural network 100 with reduced aliasing attaches details in output data to features in the per-layer intermediate data instead of attaching the details to image coordinates (e.g., pixels). The generative neural network 100 with reduced aliasing provides significant improvements for generating video and animation. Interpreting all signals in the layers 200 of the generative neural network 100 with reduced aliasing as continuous, guarantees that unwanted information cannot leak into the hierarchical synthesis process. The layers 200 of the generative neural network 100 with reduced aliasing are equivariant to translation and rotation even at subpixel scales. Compared with conventional implementations of generative neural networks, the convolution, upsampling, downsampling, and pointwise non-linear functions in the layer 200 provide reduced aliasing or alias-free operation for the generative neural network 100.

Parallel Processing Architecture

Figure 4A:
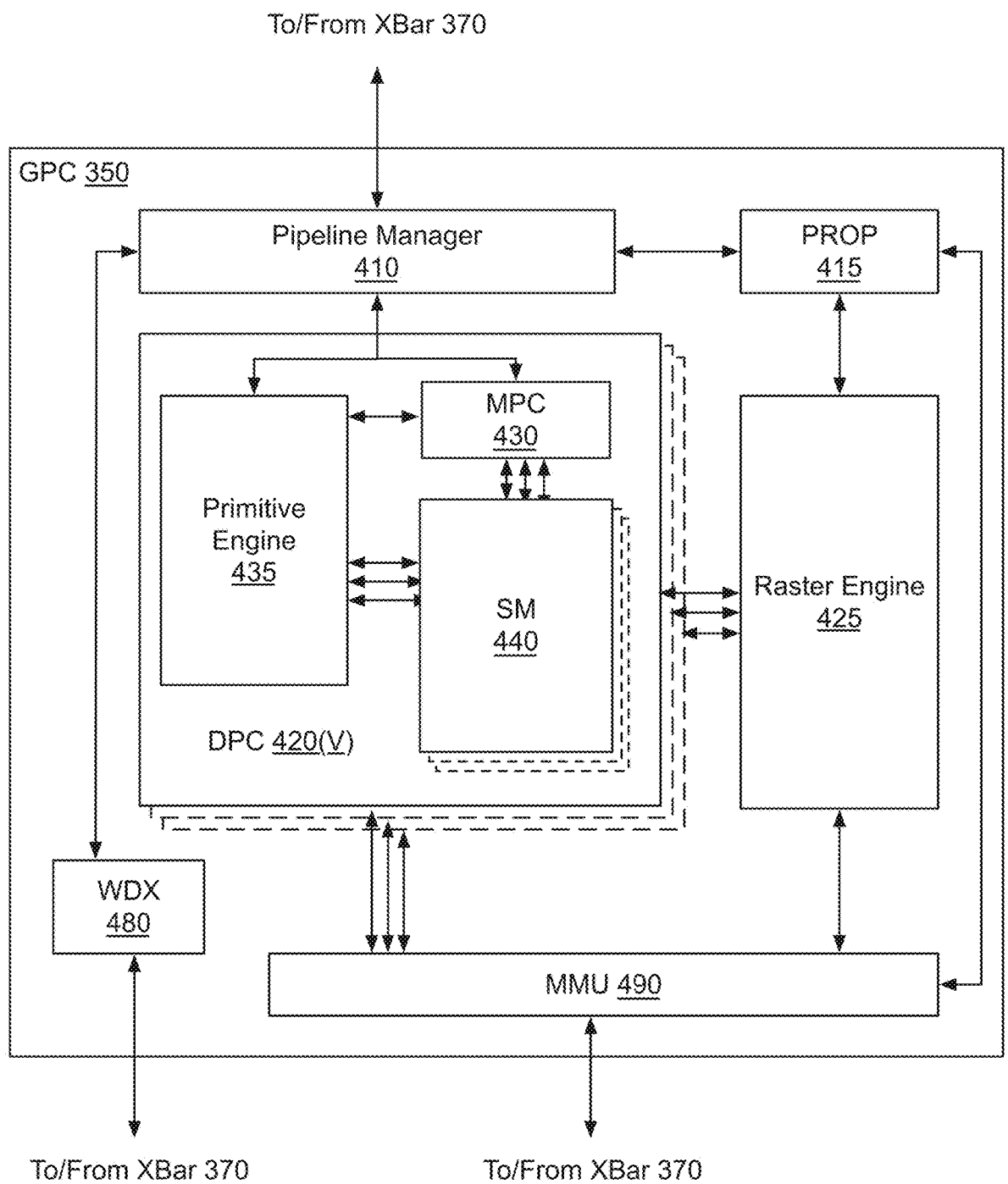
FIG. 4A illustrates an example general processing cluster within the parallel processing unit of FIG. 3, suitable for use in implementing some embodiments of the present disclosure.
Figure 4B:
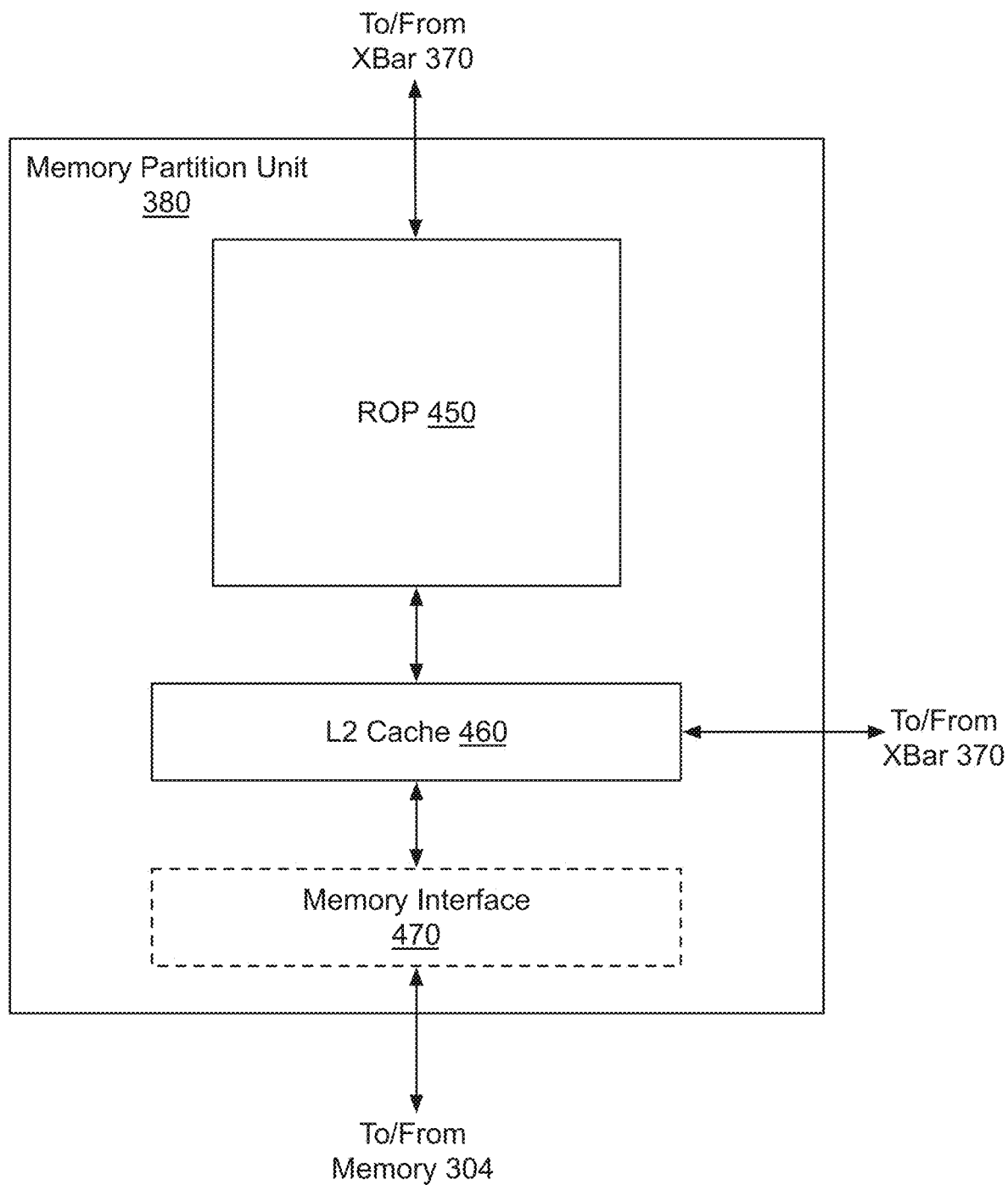
FIG. 4B illustrates an example memory partition unit of the parallel processing unit of FIG. 3, suitable for use in implementing some embodiments of the present disclosure.
Figure 4C:
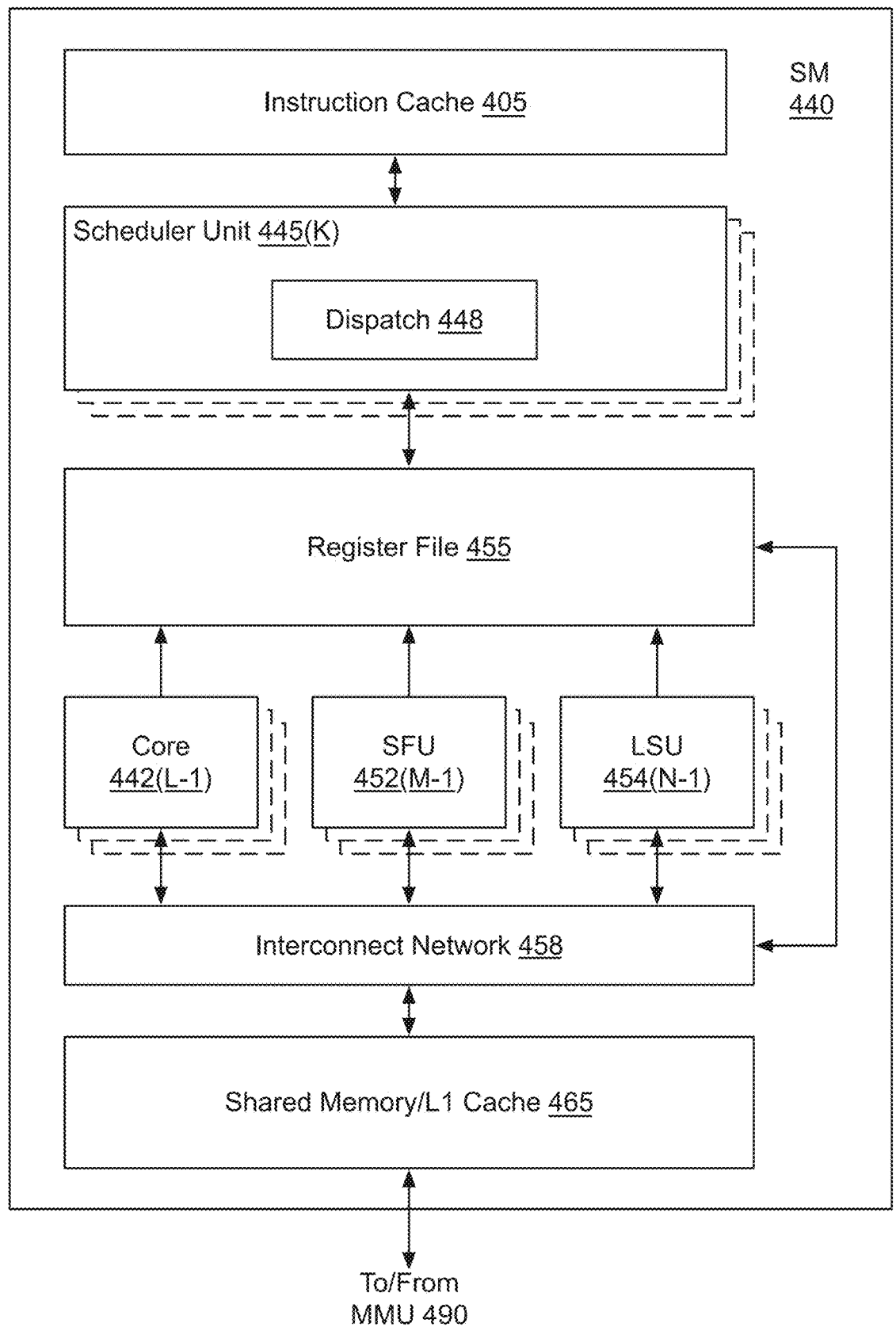
FIG. 4C illustrates an example of the streaming multiprocessor of FIG. 4A, suitable for use in implementing some embodiments of the present disclosure.

FIG. 4 illustrates a parallel processing unit (PPU) 400, in accordance with an embodiment. The PPU 400 may be used to implement the method 250. The PPU 400 may be used to implement the generative neural network 100 and/or the layer 200. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
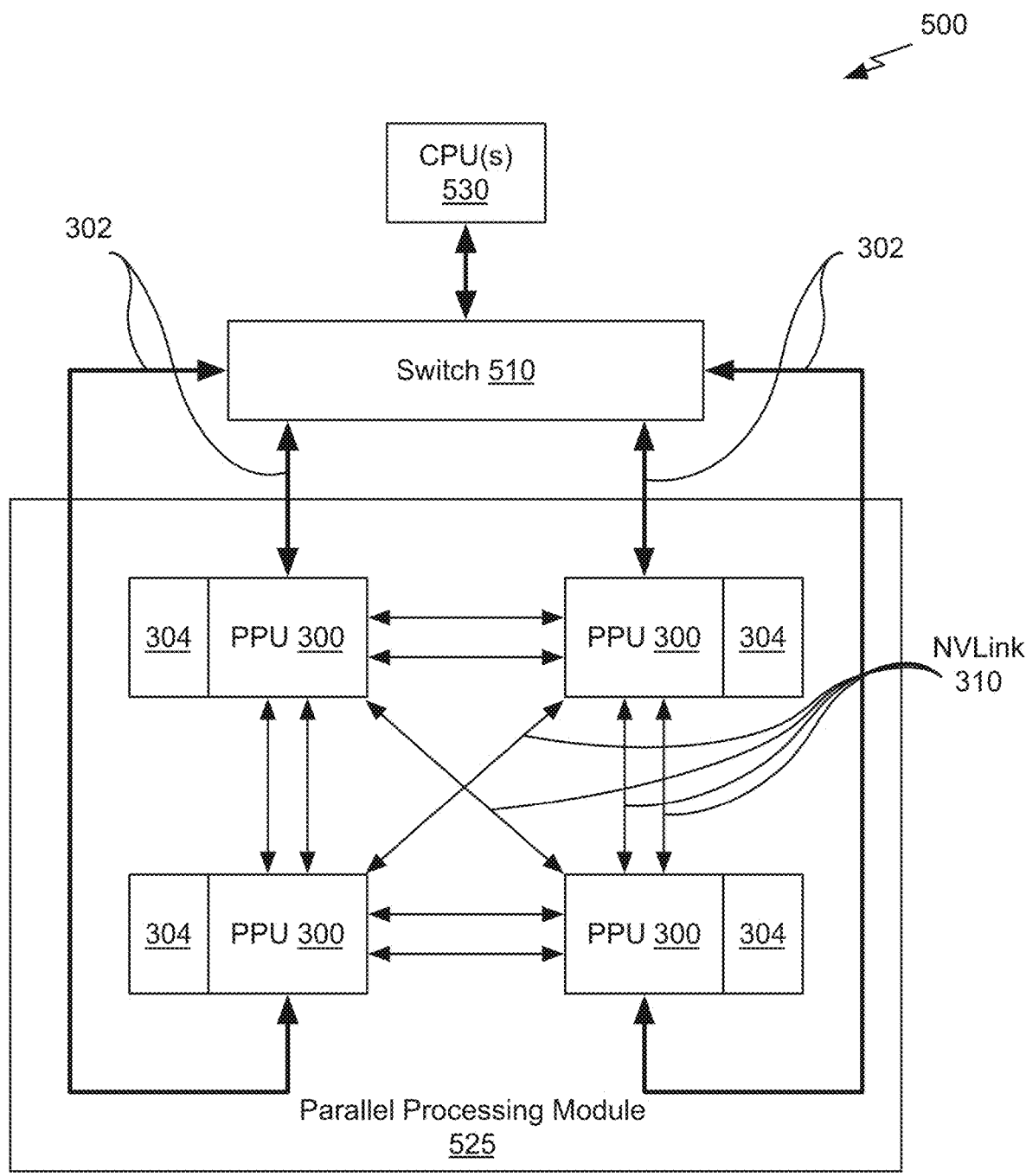
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the method 250 shown in FIG. 2B. The processing system 500 includes a CPU 530, switch 510, and multiple PPUs 400, and respective memories 404.

Figure 5B:
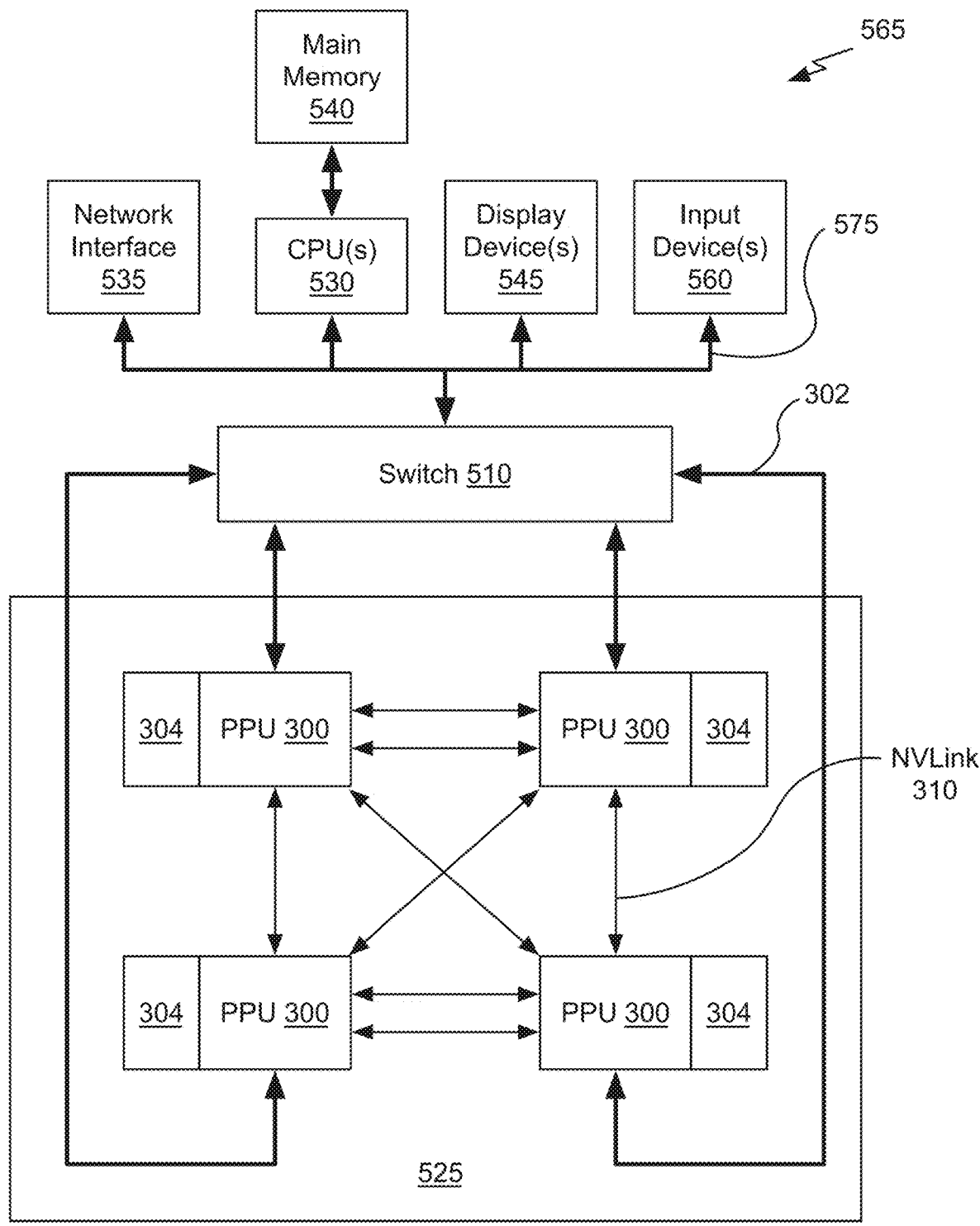
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 250 shown in FIG. 2B.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
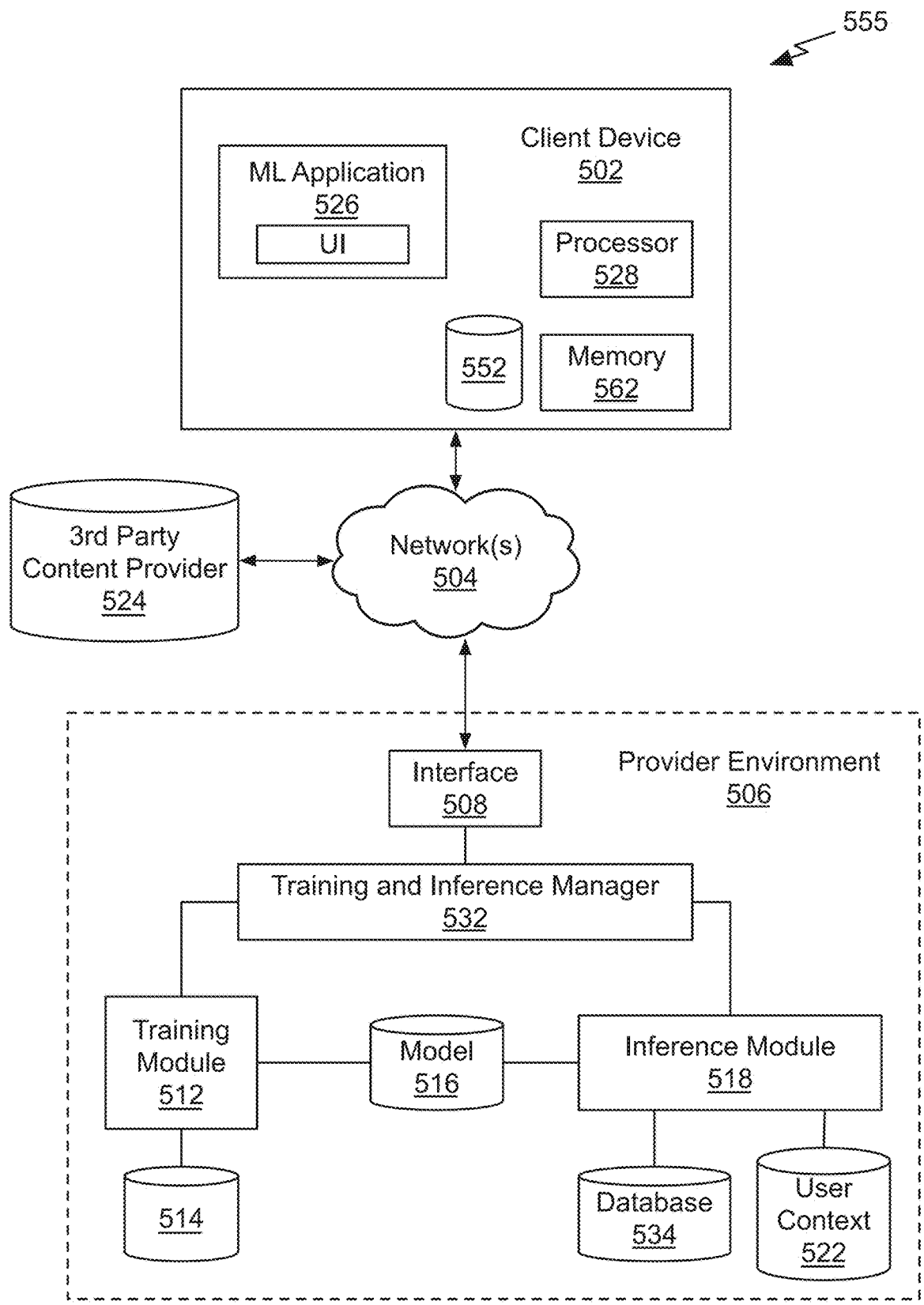
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In an embodiment, the set of training data may be used in a generative adversarial training configuration to train a generative neural network.

In at least one embodiment, training data can include images of at least one human subject, avatar, or character for which a neural network is to be trained. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6:
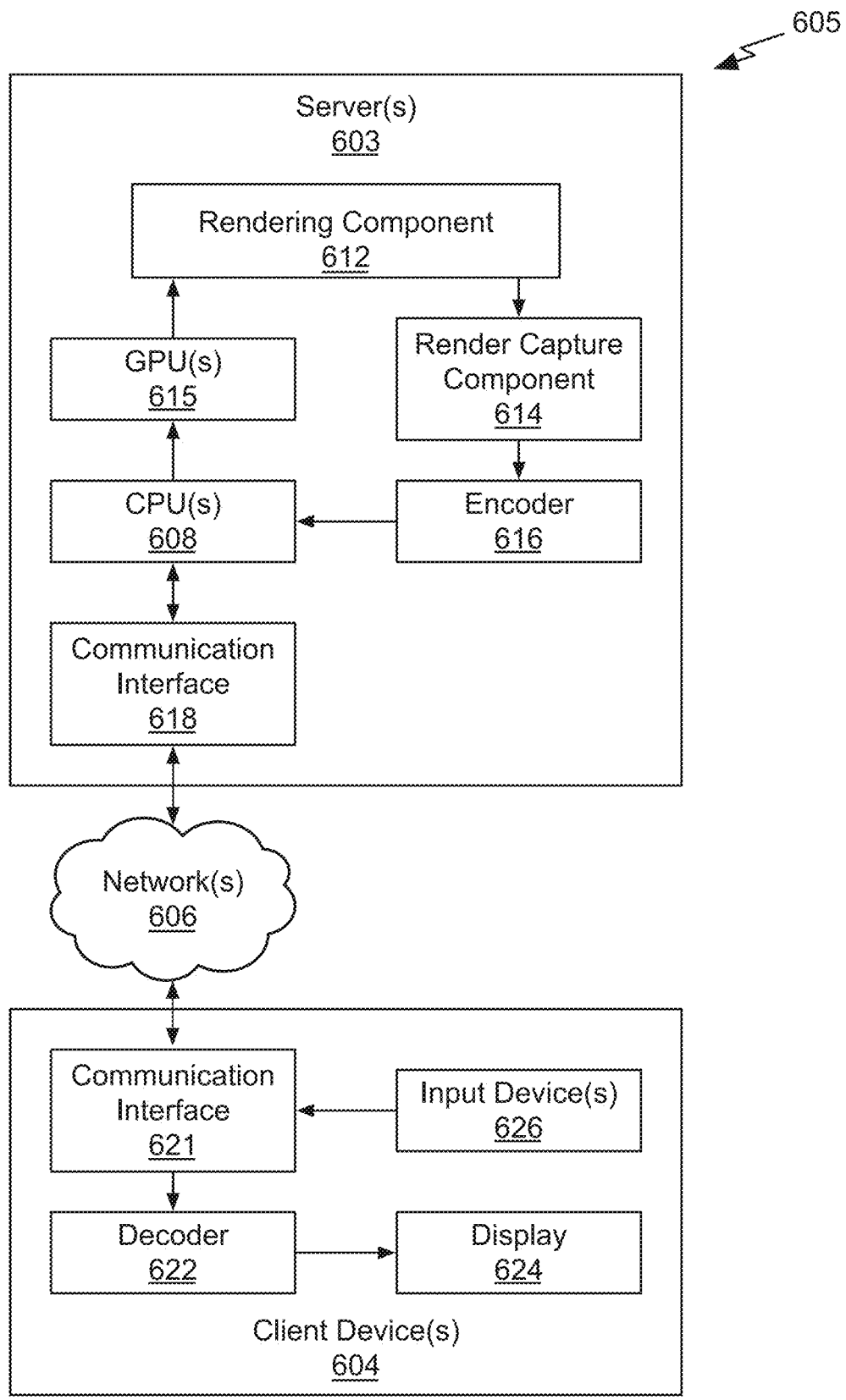
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 604 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for synthesizing content, comprising:
    receiving, at a neural network model, low resolution input data that is processed by a sequence of stages according to a latent code to produce intermediate data and a last stage in the sequence of stages produces the synthesized content comprising fine details corresponding to fine features, wherein the processing, for each operation performed in the sequence of stages that applies a pointwise nonlinearity to intermediate data at an original resolution, comprises:
    upsampling the intermediate data to produce increased resolution intermediate data;
    applying the pointwise nonlinearity to the increased resolution intermediate data to produce processed increased resolution intermediate data, wherein coarse features of the intermediate data control positions of the fine features of the increased resolution intermediate data; and
    downsampling the processed increased resolution intermediate data to produce processed intermediate data.

2. The method of claim 1, wherein the intermediate data contains only spatial frequencies at or below half a sampling rate of the original resolution.

3. The method of claim 1, wherein a rate of the upsampling equals a rate of the downsampling and the processed intermediate data is at the original resolution.

4. The method of claim 1, wherein a rate of the upsampling is twice a rate of the downsampling and the processed intermediate data is at twice the original resolution.

5. The method of claim 1, wherein the upsampling approximates continuous data to reduce aliasing during application of the pointwise nonlinearity.

6. The method of claim 1, wherein the neural network model is a generator and the synthesized content is at least one of a one-dimensional signal, a two-dimensional image, and a three-dimensional volume.

7. The method of claim 1, further comprising performing a convolution operation to produce the intermediate data.

8. The method of claim 7, wherein a 1×1 convolution kernel is used for the convolution operation.

9. The method of claim 1, wherein the upsampling, applying, and downsampling are equivariant to translation up to a desired level of accuracy.

10. The method of claim 1, wherein the upsampling, applying, and downsampling are equivariant to translation and rotation up to a desired level of accuracy.

11. The computer-implemented method of claim 1, wherein at least one of the steps of upsampling, applying, and downsampling is performed on a server or in a data center and the synthesized content is streamed to a user device.

12. The computer-implemented method of claim 1, wherein at least one of the steps of upsampling, applying, and downsampling is performed within a cloud computing environment.

13. The computer-implemented method of claim 1, wherein at least one of the steps of upsampling, applying, and downsampling is performed for training, testing, or certifying a neural network employed in a machine, robot, or autonomous vehicle.

14. The computer-implemented method of claim 1, wherein at least one of the steps of upsampling, applying, and downsampling is performed on a virtual machine comprising a portion of a graphics processing unit.

15. A system for synthesizing content, comprising:
a memory that stores low resolution input data; and
a processor that is connected to the memory, wherein the processor is configured to
implement a neural network model by:
processing the low resolution input data by a sequence of stages according to a latent code to produce intermediate data and a last stage in the sequence of stages produces the synthesized content comprising fine details corresponding to fine features, wherein the processing, for each operation performed in the sequence of stages that applies a pointwise nonlinearity to intermediate data at an original resolution, comprises:
upsampling the intermediate data to produce increased resolution intermediate data;
applying the pointwise nonlinearity to the increased resolution intermediate data to produce processed increased resolution intermediate data, wherein coarse features of the intermediate data control positions of the fine features of the increased resolution intermediate data; and
downsampling the processed increased resolution intermediate data to produce processed intermediate data.

16. The system of claim 15, wherein the intermediate data contains only spatial frequencies at or below half a sampling rate of the original resolution.

17. The system of claim 15, wherein the neural network model is a generator and the high resolution output data is at least one of a one-dimensional signal, a two-dimensional image, and a three-dimensional volume.

18. The system of claim 15, wherein the upsampling, applying, and downsampling are equivariant to translation.

19. A non-transitory computer-readable media storing computer instructions for synthesizing content that, when executed by one or more processors, cause the one or more processors to perform the steps of:
receiving, at a neural network model, low resolution input data that is processed by a sequence of stages according to a latent code to produce intermediate data and a last stage in the sequence of stages produces the synthesized content comprising fine details corresponding to fine features, wherein the processing, for each operation performed in the sequence of stages that applies a pointwise nonlinearity to intermediate data at an original resolution, comprises:
upsampling the intermediate data to produce increased resolution intermediate data;
applying the pointwise nonlinearity to the increased resolution intermediate data to produce processed increased resolution intermediate data, wherein coarse features of the intermediate data control positions of the fine features of the increased resolution intermediate data; and
downsampling the processed increased resolution intermediate data to produce processed intermediate data.

20. The non-transitory computer-readable media of claim 19, wherein the intermediate data contains only spatial frequencies at or below half a sampling rate of the original resolution.

* * * * *